US008432913B2

(12) United States Patent
Suzuki et al.

(10) Patent No.: US 8,432,913 B2
(45) Date of Patent: Apr. 30, 2013

(54) RELAY DEVICE, NETWORK SYSTEM, ROUTE SWITCHING METHOD, AND RECORDING MEDIUM

(75) Inventors: Kazuya Suzuki, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 288 days.

(21) Appl. No.: 12/922,406

(22) PCT Filed: Feb. 24, 2009

(86) PCT No.: PCT/JP2009/053294
§ 371 (c)(1),
(2), (4) Date: Sep. 13, 2010

(87) PCT Pub. No.: WO2009/130941
PCT Pub. Date: Oct. 29, 2009

(65) Prior Publication Data
US 2011/0019539 A1 Jan. 27, 2011

(30) Foreign Application Priority Data

Apr. 22, 2008 (JP) ................................ 2008-111582

(51) Int. Cl.
*H04L 12/28* (2006.01)
(52) U.S. Cl.
USPC .......................................... 370/392; 370/400
(58) Field of Classification Search .................. None
See application file for complete search history.

(56) References Cited

U.S. PATENT DOCUMENTS 7,864,666 B2 * 1/2011 Enoki et al. ................... 370/216
8,243,604 B2 * 8/2012 Kothari et al. ................. 370/238
2003/0117946 A1 * 6/2003 Fontana et al. ................ 370/216
2005/0099940 A1 * 5/2005 Ohenoja et al. ............... 370/217
2005/0111349 A1 * 5/2005 Vasseur et al. ................ 370/216
2005/0276216 A1 * 12/2005 Vasseur et al. ................ 370/222
2009/0213779 A1 * 8/2009 Zhang et al. .................. 370/315
2010/0008222 A1 * 1/2010 Le Roux et al. .............. 370/228
2010/0138482 A1 * 6/2010 Ma et al. ....................... 709/203

FOREIGN PATENT DOCUMENTS

JP 62-159943 A 7/1987
JP 2006-279482 A1 10/2006

OTHER PUBLICATIONS

Ayaka Kuroki, et al., "Continuous Modification of Link Costs for Communication Stability in Wireless Ad hoc Networks," IPSJ SIG Technical Report, Mar. 2008, pp. 7-12, vol. 2008, No. 23.
Jun Hasegawa, et al., "Proposal of Update Synchronization Method for Ad hoc Routing Tables," ATR Adaptive Communication Research Laboratories, Proceedings of the 2005 IEICE Communications Society Conference, Sep. 2005, pp. 484.

* cited by examiner

Primary Examiner — Andrew Lee
(74) Attorney, Agent, or Firm — Sughrue Mion, PLLC

(57) ABSTRACT

When a failure occurs in a link or another relay device, a route control unit updates a routing table stored in a current routing table. Upon update, it acquires inhibit target route information indicating a route likely to cause a micro-loop in the updated routing table and registers it into an inhibit target table. If route update in an adjacent relay device is completed, an inhibit control unit deletes a route in which the adjacent relay device is set as a next transfer destination from the inhibit target table. A transfer processing unit determines a transfer route of a packet based on the current routing table and, if the determined transfer route is not registered in the inhibit target table, executes transfer of the packet. A micro-loop can be thereby reliably avoided when route switching in a network system where communication between plural networks is relayed by plural relay devices.

32 Claims, 25 Drawing Sheets

NEXT TRANSFER DESTINATION 121

| ROUTE | DESTINATION NETWORK | | NEXT TRANSFER DESTINATION | INTERFACE | COST |
|---|---|---|---|---|---|
| | DESTINATION | MASK LENGTH | | | |
| 1 | 192.168.1.0 | 24 | 192.168.6.2 | 111 | 1 |
| 2 | 192.168.2.0 | 24 | 192.168.6.2 | 111 | 2 |
| 3 | 192.168.3.0 | 24 | 192.168.5.1 | 112 | 2 |
| 4 | 192.168.4.0 | 24 | 192.168.5.1 | 112 | 1 |
| . | . | . | . | . | . |
| . | . | . | . | . | . |

Fig. 2

INHIBIT TARGET TABLE 123

| ENTRY | DESTINATION NETWORK | | NEXT TRANSFER DESTINATION |
|---|---|---|---|
| | DESTINATION | MASK LENGTH | |
| 1 | 192.168.1.0 | 24 | 192.168.5.1 |
| 2 | 192.168.2.0 | 24 | 192.168.5.1 |
| . | . | . | . |
| . | . | . | . |

Fig. 3

NEXT TRANSFER DESTINATION 121 (UPDATED)

| ROUTE | DESTINATION NETWORK | | NEXT TRANSFER DESTINATION | INTERFACE | COST |
|---|---|---|---|---|---|
| | DESTINATION | MASK LENGTH | | | |
| 1 | 192.168.1.0 | 24 | 192.168.5.1 | 112 | 4 |
| 2 | 192.168.2.0 | 24 | 192.168.5.1 | 112 | 3 |
| 3 | 192.168.3.0 | 24 | 192.168.5.1 | 112 | 2 |
| 4 | 192.168.4.0 | 24 | 192.168.5.1 | 112 | 1 |
| ... | ... | ... | ... | ... | ... |

Fig. 4

INHIBIT RELEASE MESSAGE

| Command | Version | Unused |
|---|---|---|
| Route Entry 1 ||| 
| Route Entry 2 |||
| ⋮ |||

Fig. 10

Route Entry

| Adress Family Identifier | Unused |
|---|---|
| IP Address ||
| Netmask ||
| Nexthop ||

Fig. 11

| PATH/LINK | COST | CONDITION IN WHICH LOOP DOES NOT OCCUR |
|---|---|---|
| PATH 61 | X | (Y−Z)<(X+Z) |
| PATH 62 | Y | |
| LINK 72 | Z | |
| PATH 63 | (Y−Z) | |
| PATH 64 | (X+Z) | |

UNUPDATED ROUTING TABLE

| ROUTER 316 | | | | | ROUTER 311 | | | | |
|---|---|---|---|---|---|---|---|---|---|
| DESTINATION | MASK LENGTH | NEXT TRANSFER DESTINATION | INTERFACE | COST | DESTINATION | MASK LENGTH | NEXT TRANSFER DESTINATION | INTERFACE | COST |
| 192.168.1.0 | 24 | 192.168.6.2 | 316B | 1 | 192.168.1.0 | 24 | 192.168.5.2 | 311B | 2 |
| 192.168.2.0 | 24 | 192.168.6.2 | 316B | 2 | 192.168.2.0 | 24 | 192.168.4.1 | 311A | 2 |
| 192.168.3.0 | 24 | 192.168.5.1 | 316A | 2 | 192.168.3.0 | 24 | 192.168.4.1 | 311A | 1 |
| 192.168.4.0 | 24 | 192.168.5.1 | 316A | 1 | 192.168.4.0 | 24 | — | 311A | 0 |
| 192.168.5.0 | 24 | — | 316A | 0 | 192.168.5.0 | 24 | — | 311B | 0 |
| 192.168.6.0 | 24 | — | 316B | 0 | 192.168.6.0 | 24 | 192.168.5.2 | 311B | 1 |

Fig. 20

UPDATED ROUTING TABLE

| ROUTER 316 | | | | | ROUTER 311 | | | | |
|---|---|---|---|---|---|---|---|---|---|
| DESTINATION | MASK LENGTH | NEXT TRANSFER DESTINATION | INTERFACE | COST | DESTINATION | MASK LENGTH | NEXT TRANSFER DESTINATION | INTERFACE | COST |
| 192.168.1.0 | 24 | 192.168.5.1 | 316A | 4 | 192.168.1.0 | 24 | 192.168.4.1 | 311A | 3 |
| 192.168.2.0 | 24 | 192.168.5.1 | 316A | 3 | 192.168.2.0 | 24 | 192.168.4.1 | 311A | 2 |
| 192.168.3.0 | 24 | 192.168.5.1 | 316A | 2 | 192.168.3.0 | 24 | 192.168.4.1 | 311A | 1 |
| 192.168.4.0 | 24 | 192.168.5.1 | 316A | 1 | 192.168.4.0 | 24 | — | 311A | 0 |
| 192.168.5.0 | 24 | — | 316A | 0 | 192.168.5.0 | 24 | — | 311B | 0 |
| 192.168.6.0 | 24 | — | 316B | 0 | 192.168.6.0 | 24 | 192.168.5.2 | 311B | 1 |

Fig. 21

ROUTING TABLE (UNUPDATED)

| ROUTER 16 | | | | | ROUTER 15 | | | | |
|---|---|---|---|---|---|---|---|---|---|
| DESTINATION | MASK LENGTH | NEXT TRANSFER DESTINATION | INTERFACE | COST | DESTINATION | MASK LENGTH | NEXT TRANSFER DESTINATION | INTERFACE | COST |
| 192.168.1.0 | 24 | 192.168.6.2 | 16B | 1 | 192.168.1.0 | 24 | 192.168.5.2 | 15B | 2 |
| 192.168.2.0 | 24 | 192.168.6.2 | 16B | 2 | 192.168.2.0 | 24 | 192.168.4.1 | 15A | 2 |
| 192.168.3.0 | 24 | 192.168.5.1 | 16A | 2 | 192.168.3.0 | 24 | 192.168.4.1 | 15A | 1 |
| 192.168.4.0 | 24 | 192.168.5.1 | 16A | 1 | 192.168.4.0 | 24 | — | 15A | 0 |
| 192.168.5.0 | 24 | — | 16A | 0 | 192.168.5.0 | 24 | — | 15B | 0 |
| 192.168.6.0 | 24 | — | 16B | 0 | 192.168.6.0 | 24 | 192.168.5.2 | 15B | 1 |

Fig. 26

ROUTING TABLE (UPDATED)

ROUTER 16

| DESTINATION | MASK LENGTH | NEXT TRANSFER DESTINATION | INTERFACE | COST |
|---|---|---|---|---|
| 192.168.1.0 | 24 | 192.168.5.1 | 16A | 4 |
| 192.168.2.0 | 24 | 192.168.5.1 | 16A | 3 |
| 192.168.3.0 | 24 | 192.168.5.1 | 16A | 2 |
| 192.168.4.0 | 24 | 192.168.5.1 | 16A | 1 |
| 192.168.5.0 | 24 | — | 16A | 0 |
| 192.168.6.0 | 24 | — | 16B | 0 |

ROUTER 15

| DESTINATION | MASK LENGTH | NEXT TRANSFER DESTINATION | INTERFACE | COST |
|---|---|---|---|---|
| 192.168.1.0 | 24 | 192.168.4.1 | 15A | 3 |
| 192.168.2.0 | 24 | 192.168.4.1 | 15A | 2 |
| 192.168.3.0 | 24 | 192.168.4.1 | 15A | 1 |
| 192.168.4.0 | 24 | — | 15A | 0 |
| 192.168.5.0 | 24 | — | 15B | 0 |
| 192.168.6.0 | 24 | 192.168.5.2 | 15B | 1 |

Fig. 27

ROUTING TABLE

| ROUTER 16 (UPDATED) | | | | | ROUTER 15 (UNUPDATED) | | | | |
|---|---|---|---|---|---|---|---|---|---|
| DESTINATION | MASK LENGTH | NEXT TRANSFER DESTINATION | INTERFACE | COST | DESTINATION | MASK LENGTH | NEXT TRANSFER DESTINATION | INTERFACE | COST |
| 192.168.1.0 | 24 | 192.168.5.1 | 16A | 4 | 192.168.1.0 | 24 | 192.168.5.2 | 15B | 2 |
| 192.168.2.0 | 24 | 192.168.5.1 | 16A | 3 | 192.168.2.0 | 24 | 192.168.4.1 | 15A | 2 |
| 192.168.3.0 | 24 | 192.168.5.1 | 16A | 2 | 192.168.3.0 | 24 | 192.168.4.1 | 15A | 1 |
| 192.168.4.0 | 24 | 192.168.5.1 | 16A | 1 | 192.168.4.0 | 24 | — | 15A | 0 |
| 192.168.5.0 | 24 | — | 16A | 0 | 192.168.5.0 | 24 | — | 15B | 0 |
| 192.168.6.0 | 24 | — | 16B | 0 | 192.168.6.0 | 24 | 192.168.5.2 | 15B | 1 |

Fig. 28

RELAY DEVICE, NETWORK SYSTEM, ROUTE SWITCHING METHOD, AND RECORDING MEDIUM

TECHNICAL FIELD

The present invention relates to a route switching technique in a network system.

BACKGROUND ART

IGP (Interior Gateway Protocol) is known as a routing protocol of a network using an Internet protocol (which is referred to hereinafter as IP network). IGP is classified broadly into two types, which have different algorithms. One is called a distance vector type, and its typical protocol is RIP (Routing Information Protocol). In the distance vector algorithm, a route in which the number of router hops, i.e. the number of routers to pass through, between a transmission source and a destination is the smallest is selected. The other one is called a link-state type, and its exemplary protocol is OSPF (Open Shortest Path First routing). In the link-state protocol, topology information in a network system can be shared among all routers. The topology information is information about what routers exist in a system and by what links those routers are connected. Further, a router is called various names such as a relay device, a gateway device and a node.

In the link-state protocol, by using a directed graph which is generated from topology information, each router creates the shortest path tree from a path that achieves the minimum cost for each of the other routers, calculates the shortest path to a target destination, and determines the next transfer destination router with respect to each destination. Dijkstra algorithm is known as an algorithm for creating the shortest path tree. A series of shortest path selection and determination operations described above is called "route calculation" in the link-state protocol.

CROSS REFERENCE TO RELATED APPLICATIONS

This application is a National Stage of International Application No. PCT/JP2009/053294 filed Feb. 24, 2009, claiming priority based on Japanese Patent Application No. 2008-111582 filed Apr. 22, 2008, the contents of all of which are incorporated herein by reference in their entirety.

Generally, in an IP network, in order to continue a communication service by switching a route in the event of a failure, routers and links are redundantly deployed. In a system configured in this manner, when a failure occurs in a router or a link and topology information changes, a router which has detected the failure recalculates a route and provides a notification of the failure to other routers. Receiving the notification, each router recalculates a route after removing the failed link or router. A path which does not pass through the failed link or router is thereby established, so that a communication service continues. Note that a link means a network that is connected to a router, and a failure of a link includes a failure of a network itself and a failure of an interface that is connected with the network in a router.

Further, a technique to perform high-speed router switching by calculating and storing an alternate route in advance on the assumption of a failure of a link or another router and, in the event of a failure, using the stored alternate route has been considered (Patent Document 1).

Switching of a route is specifically described hereinafter with reference to FIG. 25.

FIG. 25 shows an exemplary configuration of an IP network system. A system 10 includes a plurality of (six in the illustrated example) routers 11 to 16 and a plurality of (six in the illustrated example) networks 21 to 26. The networks 21 to 26 are "192.168.1.0/24", "192.168.2.0/24", "192.168.3.0/24", "192.168.4.0/24", "192.168.5.0/24" and "192.168.6.0/24", respectively. Each router is connected with two networks and provided with interfaces (which are referred to hereinafter as IFs) for enabling connection with the two networks. For example, as shown in the figure, the router 11 is provided with an IF 11A for connection with the network 26 and an IF 11B for connection with the network 21, an IP address "192.168.2.2" in the network 26 is assigned to the IF 11A, and an IP address "192.168.1.1" in the network 21 is assigned to the IF 11B. Likewise, the router 14 is provided with an IF 14A for connection with the network 23 and an IF 14B for connection with the network 24, an IP address "192.168.3.2" in the network 23 is assigned to the IF 14A, and an IP address "192.168.4.1" in the network 24 is assigned to the IF 14B. Further, the router 15 is provided with an IF 15A for connection with the network 24 and an IF 15B for connection with the network 25, an IP address "192.168.4.2" in the network 24 is assigned to the IF 15A, and an IP address "192.168.5.1" in the network 25 is assigned to the IF 15B. The router 16 is provided with an IF 16A for connection with the network 25 and an IF 16B for connection with the network 26, an IP address "192.168.5.2" in the network 25 is assigned to the IF 16A, and an IP address "192.168.6.1" in the network 26 is assigned to the IF 16B. Although not shown in the figure, each of the router 12 and the router 13 also has two IFs for connection with two networks, and an IP address in the connected network is assigned to the respective IFs.

Although each router is connected with only two networks in FIG. 25 for easier understanding, the number of networks to which each router is connected and the number of IFs corresponding thereto are not limited to two.

Each router stores a routing table and performs packet transfer based on the routing table. FIG. 26 shows routing tables of the router 16 and the router 15 when all routers and links in the system 10 operate normally. Note that FIG. 26 shows an example in the case of OSPF.

As shown in FIG. 26, in the routing table, a destination network of a packet, a mask length, an IP address of a next transfer destination, an interface that carries out the transfer, and a cost are stored in association with one another.

For example, in the case of the router 16, it is shown that, for a packet addressed to a network (the network 21) with "192.160.1.0/24", the next transfer destination is the router 11, specifically, the IP address "192.168.6.2" of the IF 11A of the router 11, and the interface that carries out the transfer is 16B. Further, it is shown that, for a packet addressed to a network (the network 22) with "192.160.2.0/24" also, the next transfer destination is the IP address "192.168.6.2" of the IF 11A of the router 11, and the interface that carries out the transfer is 16B. On the other hand, it is shown that, for a packet addressed to a network (the network 23) with "192.160.3.0/24", the next transfer destination is the router 15, specifically, the IP address "192.168.5.1" of the IF 15B of the router 15, and the interface that carries out the transfer is 16A.

Further, in the case of the router 15, it is shown that, for a packet addressed to a network (the network 21) with "192.160.1.0/24", the next transfer destination is the router 16, specifically, the IP address "192.168.5.2" of the IF 16A of the router 16, and the interface that carries out the transfer is 15B. On the other hand, it is shown that, for a packet addressed to a network (the network 22) with "192.160.2.0/

24", the next transfer destination is the router 14, specifically, the IP address "192.168.4.1" of the IF 14B of the router 14, and the interface that carries out the transfer is 15A.

Assume the case where a failure occurs in the router 11. In this case, when the router 12 and the router 16 which are adjacent to the router 11 detect the occurrence of a failure in the router 11 based on not receiving keepalive message (Hello message in OSPF) from the router 11 for a given length of time or a disconnection notification from a lower layer, they notify that to other routers which are adjacent to themselves and update their routing tables to eliminate the router 11 from the next transfer destination. For example, when the router 16 detects a failure of the router 11, the router 16 notifies the failure of the router 11 to the router 15 and updates its routing table. When the failure of the router 11 is notified from the router 16, the router 15 notifies that to the adjacent router 14 and updates a routing table to eliminate the router 11 from the next transfer destination. In this manner, the routing tables of the respective routers that constitute the system 10 are updated sequentially.

FIG. 27 shows updated routing tables of the router 16 and the router 15. As shown in FIG. 27, in the case of the router 16, packet transfer to the network 21 (192.168.1.0/24) is carried out by the IF 16A, and the next transfer destination is changed to the IP address "192.168.5.1" of the IF 15B of the router 15. The same applies to a packet to the network 22.

Further, in the case of the router 15, packet transfer to the network 21 (192.168.1.0/24) is carried out by the IF 15A, and the next transfer destination is changed to the IP address "192.168.4.1" of the IF 14B of the router 14.

In the system 10, the routers excluding the router 11 update the routing tables in this manner, so that a communication service continues even when a failure occurs in the router 11.

It should be noted that, because the router 15 updates the routing table after the failure of the router 11 is notified from the router 16, the update of the routing table of the router 15 is made after the update of the routing table of the router 16. Specifically, a period in which the routing table is already updated in the router 16 but the routing table is not yet updated in the router 15 exists as shown in FIG. 28. During the period, packet transfer to the network 21 (192.168.1.0/24), for example, is considered.

When the router 15 receives a packet addressed to "192.168.1.0/24", it transfers the packet to "192.168.5.2", which is the router 16, as the next transfer destination based on the routing table before shown in FIG. 28. On the other hand, because the router 16 uses the routing table which has been updated, if the router 16 receives a packet addressed to "192.168.1.0/24", it transfers the packet to "192.168.5.1", which is the router 15. As a result, the packet to the network 21 is exchanged between the router 15 and the router 16. This state is called a micro-loop and causes a heavy load on the transfer processing of the both routers.

This problem can occur in any of a system that recalculates a route in the event of a failure and a so-called high-speed route switching system that calculates and stores an alternate route in advance.

Patent Document 1 discloses a technique of solving the problem of a micro-loop in the high-speed route switching system. The technique determines, when calculating and storing an alternate route in advance, whether the alternate route can form a micro-loop or not and stores only the alternate route which is determined that it does not form a micro-loop. Therefore, although the stored alternate route is used in the event of a failure, because the alternate route does not form a micro-loop, a micro-loop does not occur.

Patent Document 1

Japanese Unexamined Patent Application Publication No. 2006-279482

DISCLOSURE OF INVENTION

Technical Problem

In the system 10 shown in FIG. 25, for example, when a failure occurs in the router 11, for a packet addressed to a network (the network 21) with "192.160.1.0/24", an alternate route of the route in which the next transfer destination has been the router 11 is only the route in which the next transfer destination is the router 15 for the router 16. As described above, the route is a route where a micro-loop is likely to occur with the router 15. Thus, by the configuration of the network system, there is no other choice but to use the route that is likely to form a micro-loop as an alternate route, and there is thus a case which cannot be coped with the technique according to Patent Document 1.

The present invention has been accomplished in view of the above circumstances and provides a technique to reliably avoid a micro-loop.

Technical Solution

One aspect of the present invention is a relay device in a network system where communication between a plurality of networks is relayed by a plurality of relay devices. The relay device includes a plurality of network interfaces that are respectively connected to networks with adjacent relay devices, a current routing table storage unit, a route control unit, an inhibit target table, an inhibit control unit, and a transfer processing unit.

The transfer processing unit determines a transfer route of a packet based on the routing table stored in the current routing table storage unit and, on condition that the determined transfer route of the packet is not registered in the inhibit target table, executes transfer of the packet.

The current routing table storage unit stores a routing table where a destination and a next transfer destination being any adjacent relay device are associated.

When a failure occurs in a link or another relay device in the network system, the route control unit updates the routing table stored in the current routing table storage unit and, upon update, acquires inhibit target route information indicating a route likely to cause a micro-loop in the routing table after update.

On condition that route update in an adjacent relay device is completed, the inhibit control unit deletes a route in which the adjacent relay device is set as a next transfer destination from the inhibit target table.

Note that a network system including the relay device according to the above aspect, the implementation of the relay device according to the above aspect as a method, a program causing a computer to operate as the relay device or a computer readable recording medium recording the program is also effective as an aspect of the present invention.

Advantageous Effects

According to the technique of the present invention, it is possible to reliably avoid a micro-loop in an IP network system.

BRIEF DESCRIPTION OF DRAWINGS

FIG. 2 is a view showing an example of a current routing table before update in a router shown in FIG. 1;

FIG. 3 is a view showing an example of an inhibit target table in a router shown in FIG. 1;

FIG. 4 is a view showing an example of the current routing table shown in FIG. 2 after update;

FIG. 10 is a view showing an exemplary format of an inhibit release MSG;

FIG. 11 is a view showing an exemplary format of "Route Entry" in the inhibit release MSG shown in FIG. 10;

FIG. 20 is a view showing an example of routing tables before update of two adjacent routers in the network system shown in FIG. 14;

FIG. 21 is a view showing an example of the two routing tables shown in FIG. 20 after update;

FIG. 26 is a view showing an example of routing tables before update of the router 15 and the router 16 in the IP network system shown in FIG. 25;

FIG. 27 is a view showing an example of the routing tables shown in FIG. 26 after update; and FIG. 28 shows an example of two routing tables when route update of the router 16 is completed and route update of the router 15 is not completed in the IP network system shown in FIG. 25.

EXPLANATION OF REFERENCE

Figure 1:
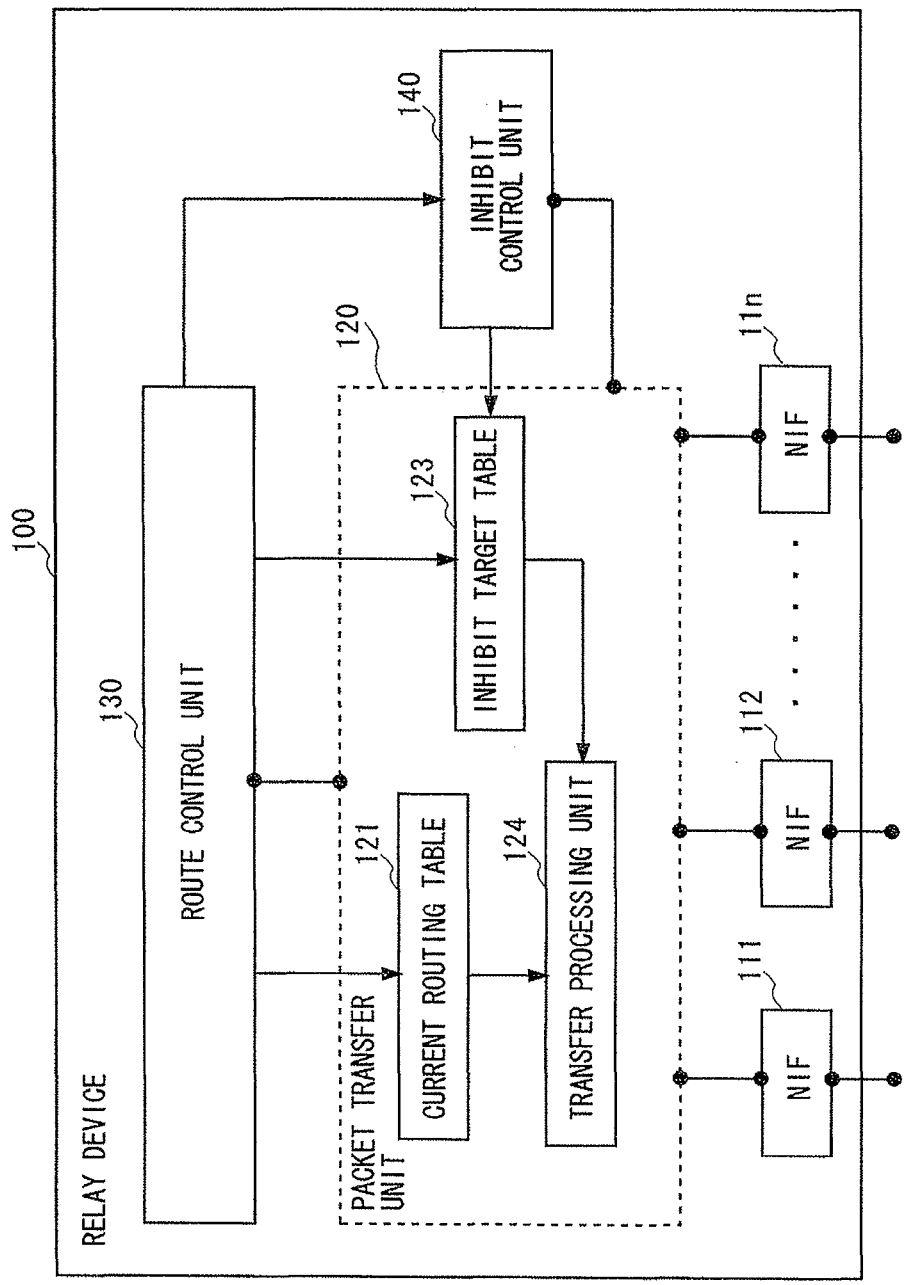
FIG. 1 is a schematic diagram of a relay device to explain the principle of the technique according to the present invention.

100 RELAY DEVICE
111-11n NETWORK INTERFACE
120 PACKET TRANSFER UNIT
121 CURRENT ROUTING TABLE
123 INHIBIT TARGET TABLE
124 TRANSFER PROCESSING UNIT
130 ROUTE CONTROL UNIT
140 INHIBIT CONTROL UNIT
200 NETWORK SYSTEM
210 ROUTER
290 NETWORK
211 NIF
212 NIF
220 PACKET TRANSFER UNIT
221 CURRENT ROUTING TABLE
222 OLD ROUTING TABLE
223 INHIBIT TARGET TABLE
224 TRANSFER PROCESSING UNIT
225 TRANSFER EXECUTION UNIT
226 FILTER UNIT
230 ROUTE CONTROL UNIT
231 TOPOLOGY INFORMATION EXCHANGE UNIT
232 ROUTE CALCULATION UNIT
233 ROUTE COMPARISON UNIT
240 INHIBIT CONTROL UNIT
241 INHIBIT RELEASE MSG TRANSMITTING UNIT
242 INHIBIT RELEASE MSG RECEIVING UNIT
243 INHIBIT RELEASE UNIT
250 ROUTER
260 INHIBIT CONTROL UNIT
261 CLOCKING UNIT
262 TIMER
263 MANAGEMENT UNIT
264 INHIBIT RELEASE UNIT
300 NETWORK SYSTEM
311-316 ROUTER
311A NIF
311B NIF
320 PACKET TRANSFER UNIT
321 CURRENT ROUTING TABLE
322 OLD ROUTING TABLE
323 INHIBIT TARGET TABLE
324 TRANSFER PROCESSING UNIT
325 TRANSFER EXECUTION UNIT
326 FILTER UNIT
330 ROUTE CONTROL UNIT
331 TOPOLOGY INFORMATION EXCHANGE UNIT
332 ROUTE CALCULATION UNIT
333 ROUTE COMPARISON UNIT
333 ALTERNATE ROUTE CALCULATION UNIT
340 INHIBIT CONTROL UNIT
341 INHIBIT RELEASE MSG TRANSMITTING UNIT
342 INHIBIT RELEASE MSG RECEIVING UNIT
343 INHIBIT RELEASE UNIT
350 HIGH-SPEED SWITCHING UNIT
351 ALTERNATE ROUTE CALCULATION UNIT
352 LOOP DETERMINATION UNIT
353 SWITCHING EXECUTION UNIT
354 ALTERNATE ROUTING TABLE GROUP
355 ALTERNATE INHIBIT TARGET TABLE GROUP 391-396 NETWORK
400 NETWORK SYSTEM
411-41n NIF
410 ROUTER
420 PACKET TRANSFER UNIT
421 ROUTING TABLE
423 INHIBIT TARGET TABLE
424 TRANSFER PROCESSING UNIT
425 TRANSFER EXECUTION UNIT
426 FILTER UNIT
430 ROUTE SETTING UNIT
431 ROUTING TABLE RECEIVING UNIT
432 UPDATE COMPLETE NOTIFICATION UNIT
440 INHIBIT CONTROL UNIT
441 INHIBIT TARGET ROUTE RECEIVING UNIT
442 INHIBIT RELEASE INSTRUCTION RECEIVING UNIT
443 INHIBIT RELEASE UNIT
500 NETWORK
510 CONTROL SERVER
511 NIF
520 PACKET TRANSFER UNIT
530 ROUTE CALCULATION MANAGEMENT UNIT
531 TOPOLOGY INFORMATION ACQUISITION UNIT
532 ROUTER-BY-ROUTER ROUTE CALCULATION UNIT
533 ROUTER-BY-ROUTER CURRENT ROUTING TABLE
534 ROUTER-BY-ROUTER OLD ROUTING TABLE
535 ROUTER-BY-ROUTER ROUTE COMPARISON UNIT
540 MESSAGE TRANSMITTING/RECEIVING UNIT
541 ROUTING TABLE TRANSMITTING UNIT
542 INHIBIT TARGET ROUTE TRANSMITTING UNIT
543 UPDATE COMPLETE NOTIFICATION RECEIVING UNIT
544 INHIBIT RELEASE INSTRUCTION TRANSMITTING UNIT

BEST MODE FOR CARRYING OUT THE INVENTION

Before describing specific embodiments of the present invention, the principle underlying the present invention is described hereinafter. Note that elements that are shown as functional blocks for performing various kinds of processing in the drawings used in the following description may be configured by a processor, memory or another circuit as hardware or may be implemented by a program recorded or loaded to memory or the like as software. It would be thus obvious to those skilled in the art that those functional blocks may be implemented in various forms such as hardware only, software only or a combination of those, and not limited to either one. Further, for easier understanding, only those needed to describe the technique of the present invention are shown in the drawings.

FIG. 1 is a schematic diagram of a relay device to which the technique according to the present invention is applied. A relay device 100 performs transfer of a packet between a plurality of networks in an IP network system, and the relay device 100 includes a plurality of network interfaces (which is referred to hereinafter as NIF) 111-11n (n≧2), a packet transfer unit 120 that performs packet transfer, a route control unit 130 that controls a route of packet transfer, and an inhibit control unit 140.

The NIF 111 to the NIF 11N are respectively connected to N number of networks, and an IP address of each network is assigned thereto.

The packet transfer unit 120 includes a current routing table 121, an inhibit target table 123, and a transfer processing unit 124.

The current routing table 121 is a routing table at the present time. FIG. 2 shows an example of the current routing table 121 in the case where OSPF is used as a routing protocol. The current routing table 121 shown in FIG. 2 is an example in the case where the relay device 100 is placed as the router 16 in the system shown in FIG. 25, and the NIF 111 and the NIF 112 correspond to the IF 16B and the IF 16A of the router 16. As shown therein, the current routing table 121 stores "destination network", "next transfer destination", "interface" and "cost" in association with one another. The "next transfer destination" is an IP address of a destination to which a packet is transferred next, which is an IP address that is assigned to an NIF of a relay device as a next transfer destination. The "interface" indicates an NIF that carries out transfer of the packet among a plurality of NIFs of the relay device 100. The "cost" indicates a cost until the packet reaches a destination network, and in OSPF, a route with the lowest cost among a plurality of candidate routes is selected. Each route shown in FIG. 2 is a route having the lowest cost for each destination.

In this manner, the current routing table 121 stores the next transfer destination and the NIF in association with one another with respect to each of all networks in the system where the relay device 100 is placed. Note that creation and update of the current routing table 121 are performed by the route control unit 130.

The inhibit target table 123 has a plurality of route entries. FIG. 3 shows an example of the inhibit target table 123. As shown therein, in the inhibit target table 123, each route entry includes "destination network" and "next transfer destination". Registration and deletion of those route entries are performed by the route control unit 130 and the inhibit control unit 140, respectively. The meaning of entries included in the inhibit target table 123 and the details of registration and deletion of the inhibit target table 123 are described later together with the route control unit 130 and the inhibit control unit 140.

The transfer processing unit 124 performs packet transfer based on the current routing table 121 and the inhibit target table 123. Specifically, the transfer processing unit 124 acquires a destination network from a destination IP address of a transfer target packet and determines "next transfer destination" and "interface" (NIF) by referring to the current routing table 121. The processing is sort of processing that selects a transfer route of the packet. Then, by referring to the inhibit target table 123, the transfer processing unit 124 checks whether the selected transfer route is included in the routes indicated by route entries in the inhibit target table 123. When the selected transfer route matches any of the routes indicated by the route entries in the inhibit target table 123, the packet is discarded. On the other hand, when the selected transfer route does not match any of the routes indicated by all the route entries in the inhibit target table 123, the packet is transferred through the selected route. Specifically, the interface (NIF) is made to transfer the packet to the next transfer destination according to the selected route.

When a failure occurs in another relay device or a link and it is necessary to update the current routing table 121, the route control unit 130 updates the current routing table 121 to an alternate routing table and also acquires inhibit target route information indicating a route in which a micro-loop is likely to occur by the update and registers the information into the inhibit target table 123.

FIG. 3 shows an example of the inhibit target table 123 which corresponds to the case of the current routing table 121 before and after update shown in FIGS. 2 and 4. As shown therein, in the inhibit target table 123, an entry 1 and an entry 2 which respectively correspond to a route 1 and a route 2 that are likely to cause a micro-loop are registered.

As described above, the transfer processing unit 124 discards a packet for which the route indicated by the entry registered in the inhibit target table 123 is selected as a transfer route. Thus, when the inhibit target table 123 is in the state shown in FIG. 3, a packet for which a transfer route in which the destination network is "192.168.1.0/24" and the next transfer destination is "192.168.5.1" is selected, which is indicated by the entry 1, is discarded. Likewise, a packet for which a transfer route in which the destination network is "192.168.2.0/24" and the next transfer destination is "192.168.5.1" is selected, which is indicated by the entry 2, is also discarded. On the other hand, because a transfer route in which the next transfer destination is also "192.168.5.1" but the destination network is "192.168.3.0/24", for example, is not registered in the inhibit target table 123, a packet for which the transfer route is selected is transferred to "192.168.5.1".

The inhibit control unit 140 performs deletion of an entry in the inhibit target table 123. Specifically, on condition that route update in an adjacent relay device is completed, the inhibit control unit 140 deletes an entry corresponding to a route in which the "next transfer destination" is the adjacent relay device among the entries registered in the inhibit target table 123. For example, regarding the entry 1 and the entry 2 shown in FIG. 3, when route update in the adjacent relay device corresponding to "192.168.5.1" of the "next transfer destination" (which is the router 15 in the case of the system 10 shown in FIG. 25) is completed, the inhibit control unit 140 deletes the entry 1 and the entry 2. Consequently, a packet for which the route indicated by the entry 1 and the entry 2 is selected as a transfer route is also transferred after that.

In this manner, according to the relay device 100, at the time of switching a route, the current routing table 121 is updated and, at the same time, a route which is likely to cause a micro-loop in the updated current routing table 121 is registered into the inhibit target table 123. Then, at the time of transferring a packet, the packet is transferred on condition that the transfer route selected based on the new current routing table 121 is not registered in the inhibit target table 123.

Further, on condition that route update in an adjacent relay device corresponding to the "next transfer destination" of the route registered in the inhibit target table 123 is completed, the relay device 100 deletes an entry in which the adjacent relay device is set as the "next transfer destination" from the inhibit target table 123. Consequently, a packet for which the route in which the adjacent relay device is set as the "next transfer destination" is selected as a transfer route is also transferred after that.

Specifically, according to the technique of the present invention, even when a route that can be used as an alternate route is only a route in which a micro-loop is likely to occur, it is possible to use the alternate route, avoiding a micro-loop.

Because the technique of Patent Document 1 avoids use of a route in which a micro-loop is likely to occur as an alternate route, a packet that uses the route cannot reach a destination, which causes a decrease in the efficiently of a system. On the other hand, according to the relay device 100 based on the technique of the present invention, an alternate route becomes available when it becomes the situation in which a micro-loop does not occur by completion of route update in an adjacent relay device, which contributes to an increase in the transfer efficiently of a system as a whole.

In the technique that the route control unit 130 acquires an alternate routing table and inhibit target route information, those information may be obtained by the route control unit 130 itself, or when a control server that performs processing related to route switching of each relay device is installed in a network system, acquisition may be made by receiving an alternate routing table and inhibit target route information transmitted from the control server.

Further, various ways are considered for the technique that the inhibit control unit 140 checks completion of route update in an adjacent relay device.

For example, a function of providing a notification (update complete notification) to an adjacent relay device upon completion of route update in its own device and a function of receiving an update complete notification from another relay device are incorporated into each relay device in an IP network. The two functions may be included in the inhibit control unit 140, for example. The inhibit control unit 140 provides, upon completion of update of the current routing table 121 in the relay device 100, an update complete notification to an adjacent relay device through the packet transfer unit 120, and, upon receiving an update complete notification from an adjacent relay device, deletes an entry in which the IP address of the NIF of the relevant relay device is set as the next transfer destination from the inhibit target table 123.

Note that the inhibit control unit 140 may be notified of update completion of the current routing table 121 from the route control unit 130.

Further, as an update complete notification, each relay device may transmit a message indicating a route in which its own device is set as the next transfer destination is likely to be registered in an inhibit target table of an adjacent relay device as an inhibit target route (which is referred to hereinafter as inhibit release MSG) to an adjacent relay device. Because the inhibit release MSG contains information of a route for which inhibit should be released by an adjacent relay device, the relay device which has received the inhibit release MSG does not need to check which entry in its inhibit target table is a route in which a relay device which has transmitted the update complete notification is set as the next transfer destination, and it can simply delete an entry when there is an entry corresponding to the route indicated by the inhibit release MSG in the inhibit target table.

Further, in the case of a network system in which the above-described control server is placed, each relay device may transmit an update complete notification to the control server, and the control server may notify that to each adjacent relay device to a transmission source relay device of the received update complete notification.

Further, a technique that deletes an entry in the inhibit target table 123 based on an estimated value of time taken for route update in an adjacent relay device. For example, the inhibit control unit 140 stores an estimated value of time which is taken to perform route update in each adjacent relay device and, when the time from the start of update of the current routing table 121 by the route control unit 130 reaches the stored estimated value, deletes an entry in which an adjacent device corresponding to the estimated value is set as the next transfer destination from the inhibit target table 123. Note that the estimated value has the length during which an adjacent relay device can surely complete route update, which can be known from the specification of an adjacent relay device or simulation on the basis of a band or the like.

The technique according to the present invention may be applied not only to a system that recalculates a route and updates a routing table each time route switching is necessary but also to a so-called high-speed switching system.

In this case, an alternate route is calculated and stored in advance, and a routing table is updated using the alternate route at the time of route switching. This is described in detail later in an embodiment. By applying the technique of the present invention to a high-speed switching system, it is possible to obtain the above-described advantageous effect of the present invention and further save the time for recalculation of a route, thereby enabling high-speed route switching.

Based on the above description, embodiments of the present invention are described hereinafter.

First Embodiment

Figure 5:
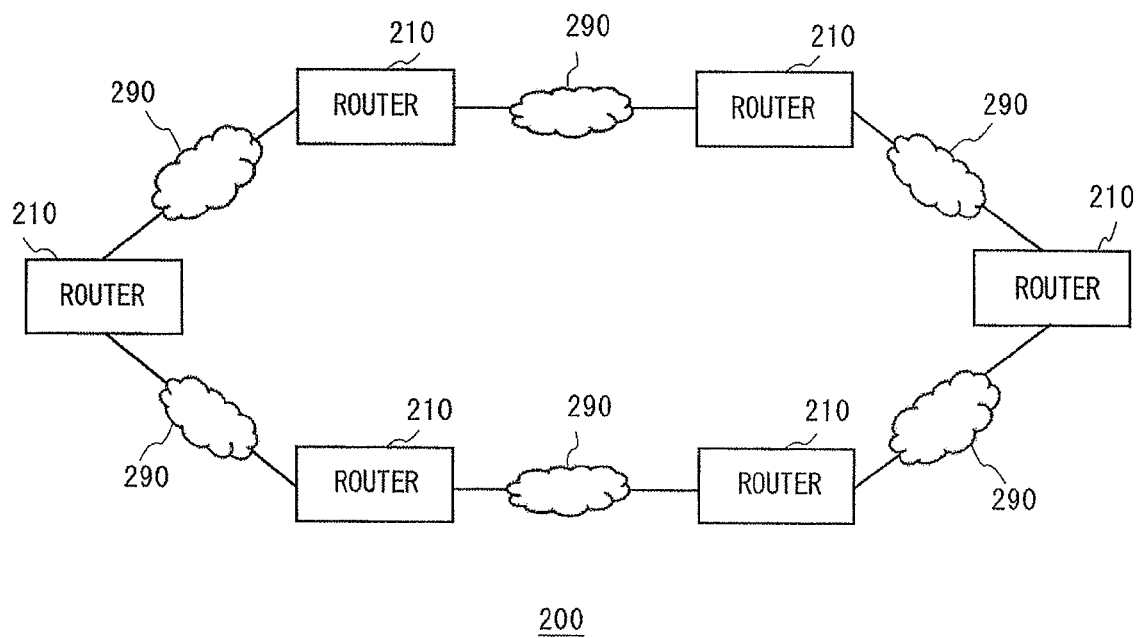
FIG. 5 is a view showing a network system according to a first embodiment of the present invention.

FIG. 5 shows a network system 200 according to a first embodiment of the present invention. The network system 200 is configured by connecting a plurality of routers 210 and a plurality of networks 290, and communication between the networks 290 is relayed by the routers 210. Note that, in the example of FIG. 5, each router is connected with two networks.

Figure 6:
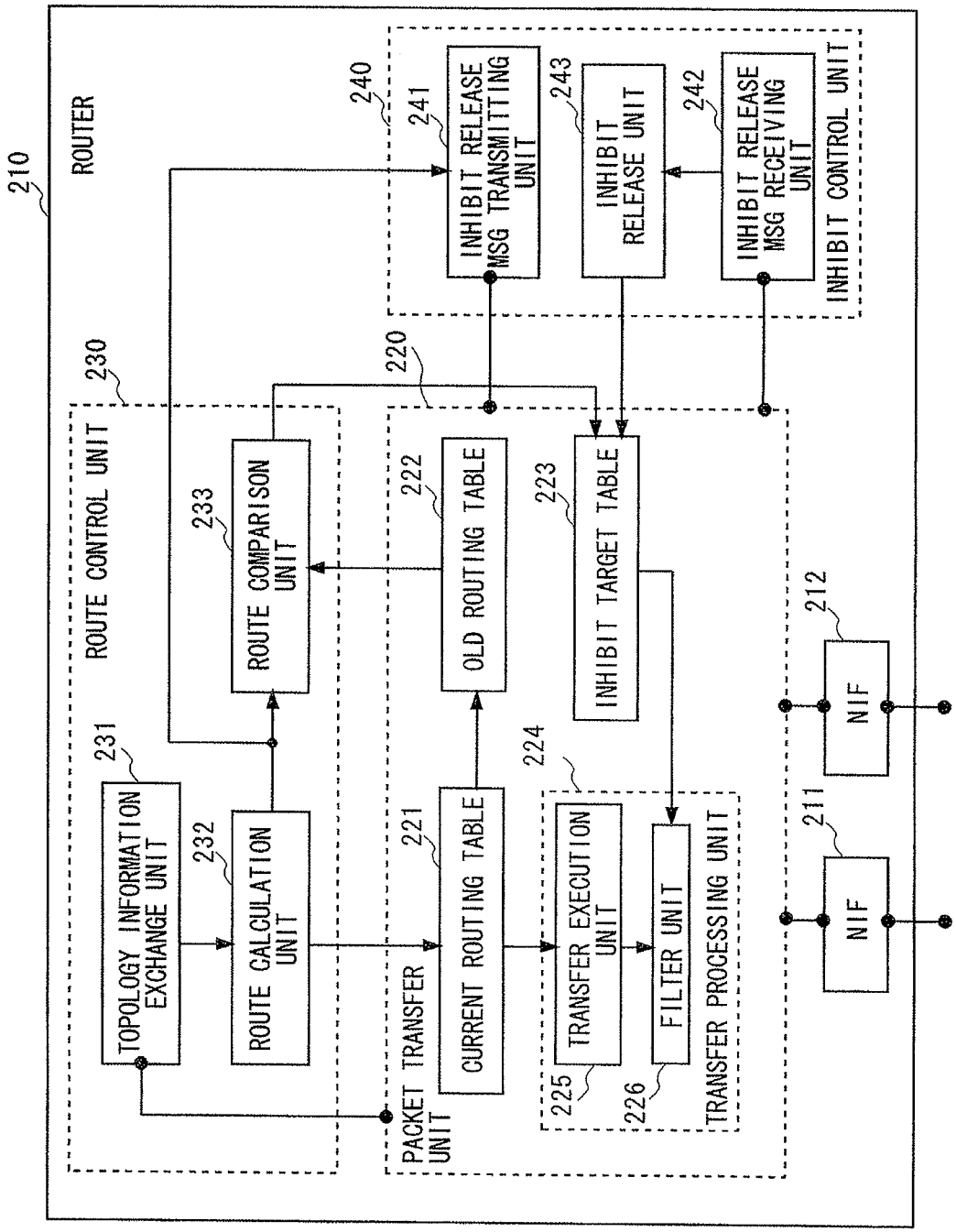
FIG. 6 is a view showing a router in the network system shown in FIG. 5.

FIG. 6 shows the router 210. The router 210 includes two network interfaces (NIF 211 and NIF 212), a packet transfer unit 220, a route control unit 230, and an inhibit control unit 240.

In this embodiment, because the router 210 is connected with two networks, the NIF 211 and the NIF 212 are respectively connected with the two networks, and an IP address of each network is assigned thereto.

The packet transfer unit 220 has the same function as the packet transfer unit 120 in the relay device 100 (cf. FIG. 1) which is used when describing the principle of the present invention. As shown therein, the packet transfer unit 220 includes a current routing table 221, an old routing table 222, an inhibit target table 223, and a transfer processing unit 224.

The current routing table 221 is a routing table at the present time which is used by the router 210. At the time of route switching, it is updated by the route control unit 230. Further, when the current routing table 221 is updated, the routing table before update is output to the old routing table 222. The old routing table 222 stores an old routing table from the current routing table 221. Accordingly, the old routing table 222 is a routing table which is just previous to the current routing table 221.

The inhibit target table 223 has a plurality of route entries, and registration of those route entries is performed by a route comparison unit 233, which is described later, of the route control unit 230, and deletion is performed by an inhibit release unit 243, which is described later, of the inhibit control unit 240.

The transfer processing unit 224 includes a transfer execution unit 225 and a filter unit 226. The transfer execution unit 225 acquires "destination network" from a destination IP address of a packet and, by referring to the current routing table 221, specifies "next transfer destination" and an interface (the NIF 211 or the NIF 212) which are associated with the "destination network". A transfer route of a packet is thereby specified. Based on the route specified by the transfer execution unit 225, the filter unit 226 checks whether a route entry having the same "destination network" and "next transfer destination" as the route exists in the inhibit target table 223. As a result of checking, if the relevant route entry exists, the packet is discarded, and, if the relevant route entry does not exist, the packet is transferred.

The route control unit 230 includes a topology information exchange unit 231, a route calculation unit 232, and a route comparison unit 233.

The topology information exchange unit 231 exchanges topology information between the router 210 and another relay device through the packet transfer unit 220 by using a routing protocol, such as OSPF, for example. For example, when the topology information exchange unit 231 detects a failure in a link connected to the NIF 211 and the NIF 212 or an adjacent router, it recognizes that a change has occurred in topology information and notifies the change to each adjacent router. Further, a change in topology information of another router or a link is notified from an adjacent router also. In this manner, when a change occurs in topology information, the topology information exchange unit 231 notifies the change to the route calculation unit 232.

The route calculation unit 232, in conformity with an OSPF protocol, calculates a route with the lowest cost with respect to each destination network by using the topology information from the topology information exchange unit 231 and supplies it to the current routing table 221. Further, according to a change in topology information notified from the topology information exchange unit 231, the route calculation unit 232 recalculates a route with the lowest cost after removing a link or a router in which a failure occurs and obtains new route information. The route calculation unit 232 updates the current routing table 221 by using the route information obtained by recalculation and also outputs it to the inhibit control unit 240. Note that, along with the update of the current routing table 221, a routing table that has been stored in the current routing table 221 is output as an old routing table to the old routing table 222, and the old routing table 222 is updated.

The route comparison unit 233 compares the new route calculated by the route calculation unit 232 with the previous routing table stored in the old routing table 222, creates a route entry for a route in which a change has occurred and resisters it into the inhibit target table 223.

The "route in which a change has occurred" means a route in which a destination network is the same and a next transfer destination is different between the new and old routing tables. Such a route is a route in which a micro-loop is likely to occur. Note that "next transfer destination is different" has the same meaning as that an interface that carries out transfer to a next transfer destination is different.

The inhibit control unit 240 includes an inhibit release MSG transmitting unit 241, an inhibit release MSG receiving unit 242 and an inhibit release unit 243, and the inhibit release MSG transmitting unit 241 has a function of transmitting an inhibit release message (inhibit release MSG), and the inhibit release MSG receiving unit 242 and the inhibit release unit 243 have a function of deleting a route entry registered in the inhibit target table 223. The inhibit release MSG transmitting unit 241 transmits the inhibit release MSG to an adjacent router on condition that update of the current routing table 221 is completed. The inhibit release MSG receiving unit 242 receives an inhibit release MSG from another router through the NIF and the packet transfer unit 220 and outputs it to the inhibit release unit 243. The inhibit release unit 243 deletes the relevant entry in the inhibit target table 223 based on the inhibit release MSG from the inhibit release MSG receiving unit 242.

Hereinafter, a route switching process which is performed in the router 210 when the topology information exchange unit 231 recognizes the occurrence of a change in topology information is described in detail.

Figure 7:
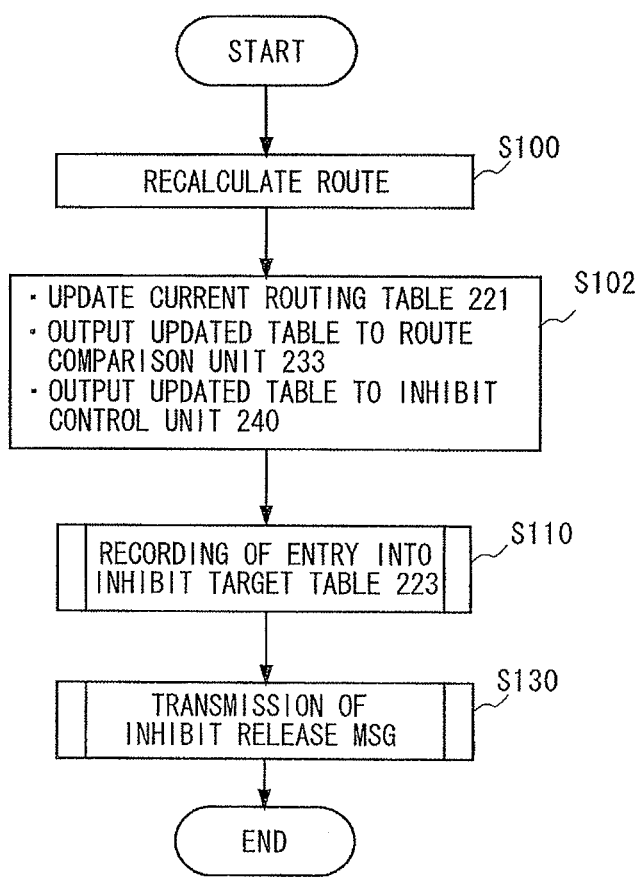
FIG. 7 is a flowchart showing a process related to route update performed in the router shown in FIG. 6 when a change occurs in topology information.

As shown in the flowchart of FIG. 7, in this case, the route calculation unit 232 first recalculates a route by normal route calculation of IPG after removing a link or a router where a failure occurs (S100). The route calculation unit 232 updates the current routing table 221 to a routing table indicating a new route obtained by the recalculation and outputs the new routing table to the route comparison unit 233 and the inhibit control unit 240 (S102). Note that the old routing table 222 is updated to the current routing table 221 before update.

The route comparison unit 233 compares the routing table of the new route notified from the route calculation unit 232 (which is the same as the current routing table 221 after update) and the old routing table 222 (which is the same as the current routing table 221 before update) and, according to a result of comparison, registers an entry of a route to serve as an inhibit target into the inhibit target table 223 (S110). In addition, the inhibit release MSG transmitting unit 241 transmits an inhibit release MSG to each adjacent router (S130).

Figure 8:
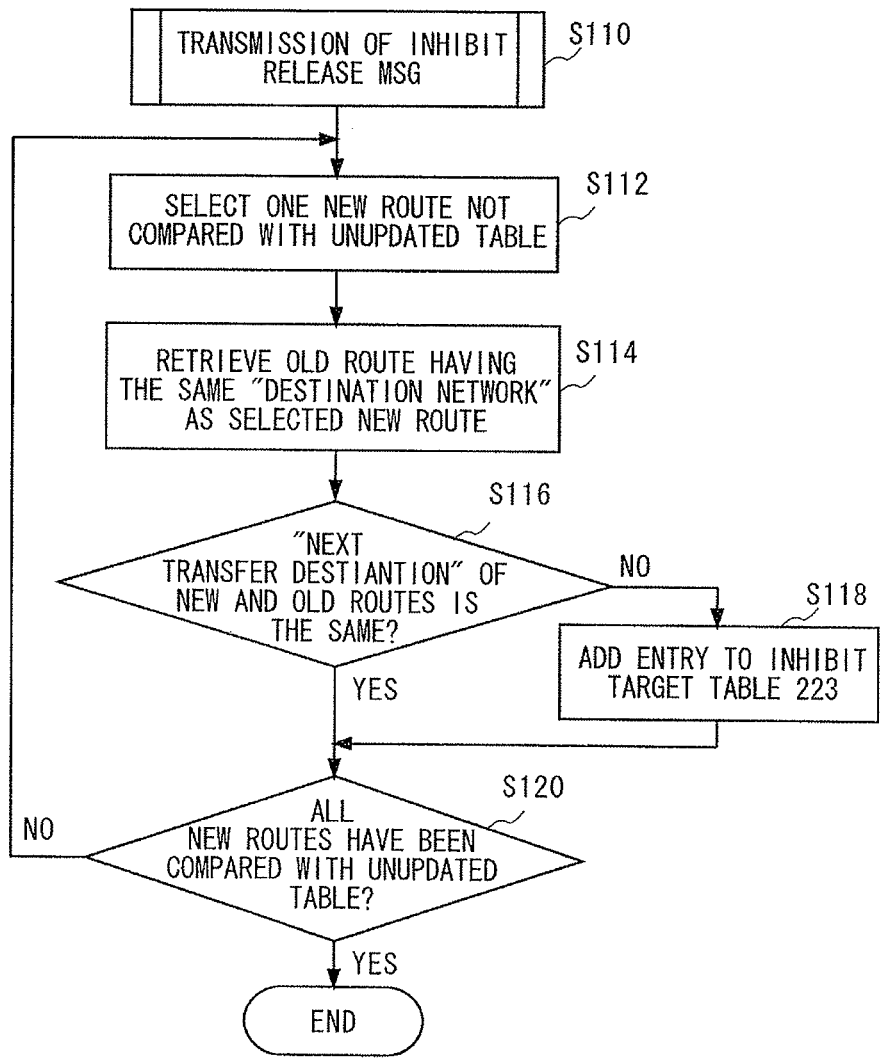
FIG. 8 is a flowchart showing processing of Step S110 in FIG. 7 in detail.

FIG. 8 is a flowchart showing the detail of the process of registering an entry into the inhibit target table 223 in Step S110 of FIG. 7. The route comparison unit 233 first selects one route which has not been compared with the old routing table 222 from the routes included in the new routing table (S112). Then, the route comparison unit 233 retrieves a route in which the "destination network" is the same as that of the selected route from the old routing table 222 (S114). The inhibit target table 223 compares the new route selected in Step S111 with the "next transfer destination" of the old route retrieved in Step S114, and when they do not match, adds an entry with the "destination network" and the "next transfer destination" of the new route as shown in FIG. 3 to the inhibit target table 223 (S116, No in S118). On the other hand, when they match, no entry is added for the new route (Yes in S116).

The route comparison unit 233 performs the processing of Steps S112 to S118 for each route in the new routing table (No in S120, S112), and, when comparison is completed for all routes (Yes in S120), the process ends.

Figure 9:
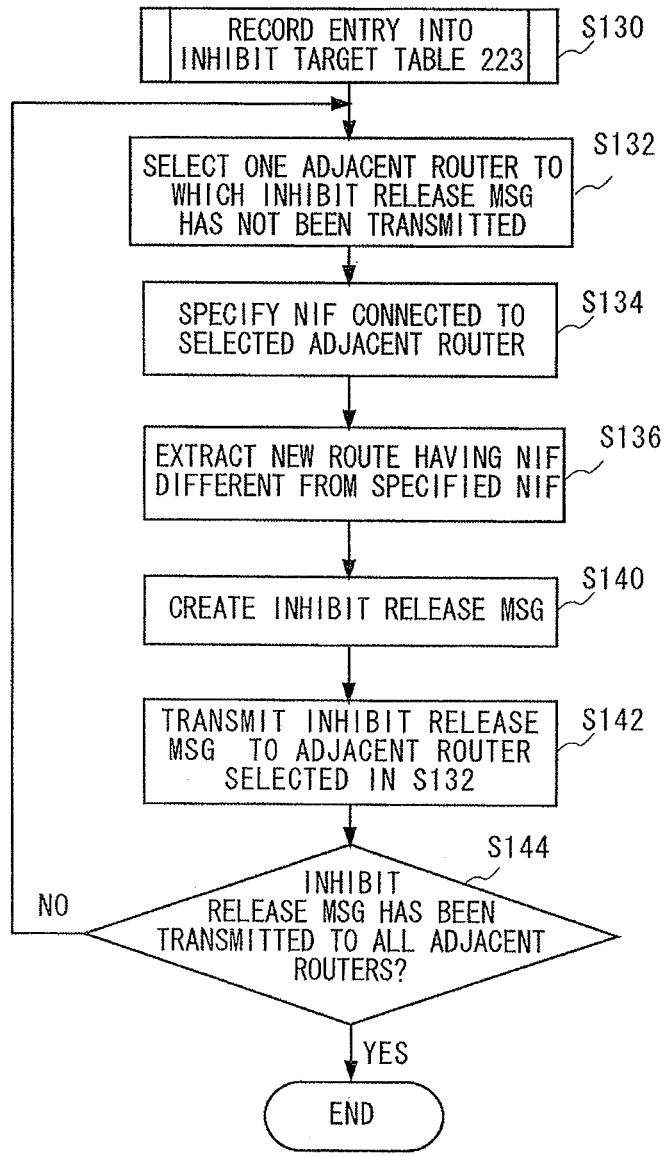
FIG. 9 is a flowchart showing processing of Step S130 in FIG. 7 in detail.

In parallel with the registration of an entry into the inhibit target table 223 by the route comparison unit 233, the inhibit release MSG transmitting unit 241 in the inhibit control unit 240 performs transmission of an inhibit release MSG. As shown in the flowchart of FIG. 9, the inhibit release MSG transmitting unit 241 first selects one router to which an inhibit release MSG has not been transmitted from the adjacent routers (S132). Then, the inhibit release MSG transmitting unit 241 specifies an interface (NIF) which is connected to the selected adjacent router (S134). The inhibit release MSG transmitting unit 241 extracts all routes having the "interface" which is different from the NIF specified in Step S134 from the respective routes included in the new routing table and creates an inhibit release MSG (S136, S140). The inhibit release MSG transmitting unit 241 then transmits the inhibit release MSG created in Step S140 to the adjacent router selected in Step S132 (S142). Note that the transmission is performed through the NIF specified in Step S134.

When the inhibit release MSG transmitting unit 241 completes the processing of Steps S132 to S144 for all adjacent routers (Yes in S144), the process ends.

FIG. 10 and FIG. 11 show exemplary packet formats of the inhibit release MSG and "Route Entry" in the inhibit release MSG. Note that, although FIG. 10 and FIG. 11 show exemplary formats in the case of IPv4, the same is true for the case of IPv6.

As shown in FIG. 10, the inhibit release MSG is made up of "Command", "Version", "Unused", and a plurality of "Route Entries".

In the "Command" field, a value indicating processing to be performed by the router which has received the packet is stored, and, in this embodiment, a value indicating inhibit release for a route designated by "Route Entry", e.g. "1", is stored.

The "Version" field is to enable identification when a change occurs in the format shown in FIG. 10 in the future, and, in this embodiment, the current version, e.g. "1", is stored.

The "Unused" field is prepared for future format expansion or the like and not used in this embodiment, and any value may be stored.

In the "Route Entry" field, information related to a route for which inhibit should be released is stored. As shown in FIG. 11, the field includes "IP Address", "Netmask" and "Nexthop" in addition to "Address Family Identifier" and "Unused".

"Unused" is the field which is not used in this embodiment. In the "Address Family Identifier" field, a value specifying an address family of a route treated in "Route Entry" is stored. In the case of IPv4, the value of AF_INET(2) is stored therein.

In "IP Address" and "Netmask", "destination network" (cf. FIG. 2) of the relevant route is stored. Note that the value of the "Netmask" field is stored in the netmask format. For example, for the route 1 shown in FIG. 2, "Netmask" which is "24" is stored in binary numeral "11111111 11111111 11111111 0000000".

The value of "Nexthop" indicates the next transfer destination of a router that receives an inhibit release MSG, not the next transfer destination of a router that transmits an inhibit release MSG. Therefore, in this field is an IP address of the NIF which is selected as an interface to transmit an inhibit release MSG, among IP addresses of the router that transmits the inhibit release MSG. The NIF is an NIF specified in Step S134 of the flowchart of FIG. 9.

In the example of the inhibit release MSG shown in FIG. 10 and FIG. 11, UDP which is widely used as a protocol of the transport layer is applied. Specifically, at the time of transmission, an UDP header and an IP header are further added to the inhibit release MSG shown in FIG. 10. In the IP header, the destination address of the inhibit release MSG is an IP address of a transmission destination adjacent router, and the transmission source address is an IP address of an NIF to carry out the transmission. Predetermined values are used for a destination and a transmission source port number in the UDP header.

Further, the maximum value of the number of "Route Entries" included in one inhibit release MSG is defined to the maximum value in such a way that the packet length including the IP header and the UDP header does not exceed the MTU length of the transmission source NIF. When the number of "Route Entries" is greater than the maximum value, those "Route Entries" may be stored divided into a plurality of inhibit release MSGs for transmission.

The inhibit release MSG receiving unit 242 receives such an inhibit release MSG from an adjacent router in which update of a routing table is completed. Based on each "Route Entry" of the received inhibit release MSG, the inhibit release unit 243 sets the network indicated by "IP Address" and "Netmask" in the relevant "Route Entry" as "destination network", and deletes the route entry in which the same IP address as "Nexthop" is set as "next transfer destination" from the inhibit target table 223.

The network system 200 is an embodiment of the principle of the present invention, and it is possible to reliably avoid a micro-loop if each router 210 has the function of the relay device 100 shown in FIG. 1.

Second Embodiment

Figure 12:
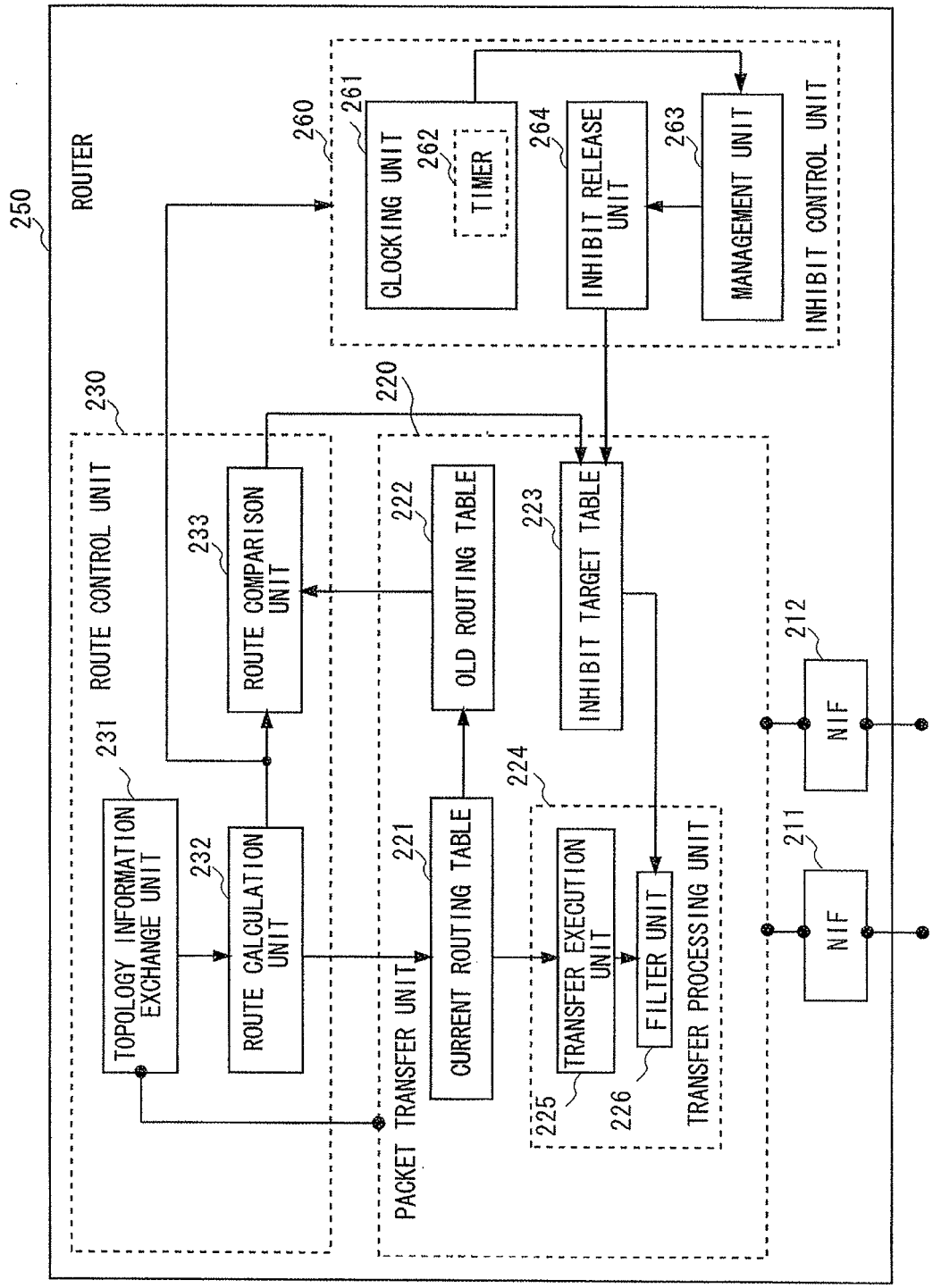
FIG. 12 is a view showing a router according to a second embodiment of the present invention.

FIG. 12 shows a router 250 according to a second embodiment of the present invention. The router 250 has the same configuration as the router 210 shown in FIG. 6 except that its inhibit control unit 260 is different from the inhibit control unit 240 of the router 210. Hereinafter, only the inhibit control unit 260 of the router 250 is described.

As shown in FIG. 12, the inhibit control unit 260 of the router 250 includes a clocking unit 261, a management unit 263 and an inhibit release unit 264, and the clocking unit 261 includes a timer 262. When the clocking unit 261 is notified that update of the current routing table 221 is completed from the route calculation unit 232, it starts the timer 262. Clocking is thereby started. The management unit 263 stores an estimated value of the time for route update with respect to each adjacent router, and when the timer value counted by the timer 261 reaches the estimated value of the adjacent router, the management unit 263 instructs the inhibit release unit 264 to delete the entry for the adjacent router in the inhibit target table 223. The inhibit release unit 264 receives the instruction from the management unit 263 and deletes the entry in which the adjacent router is set as the next transfer destination from the inhibit target table 223.

Figure 13:
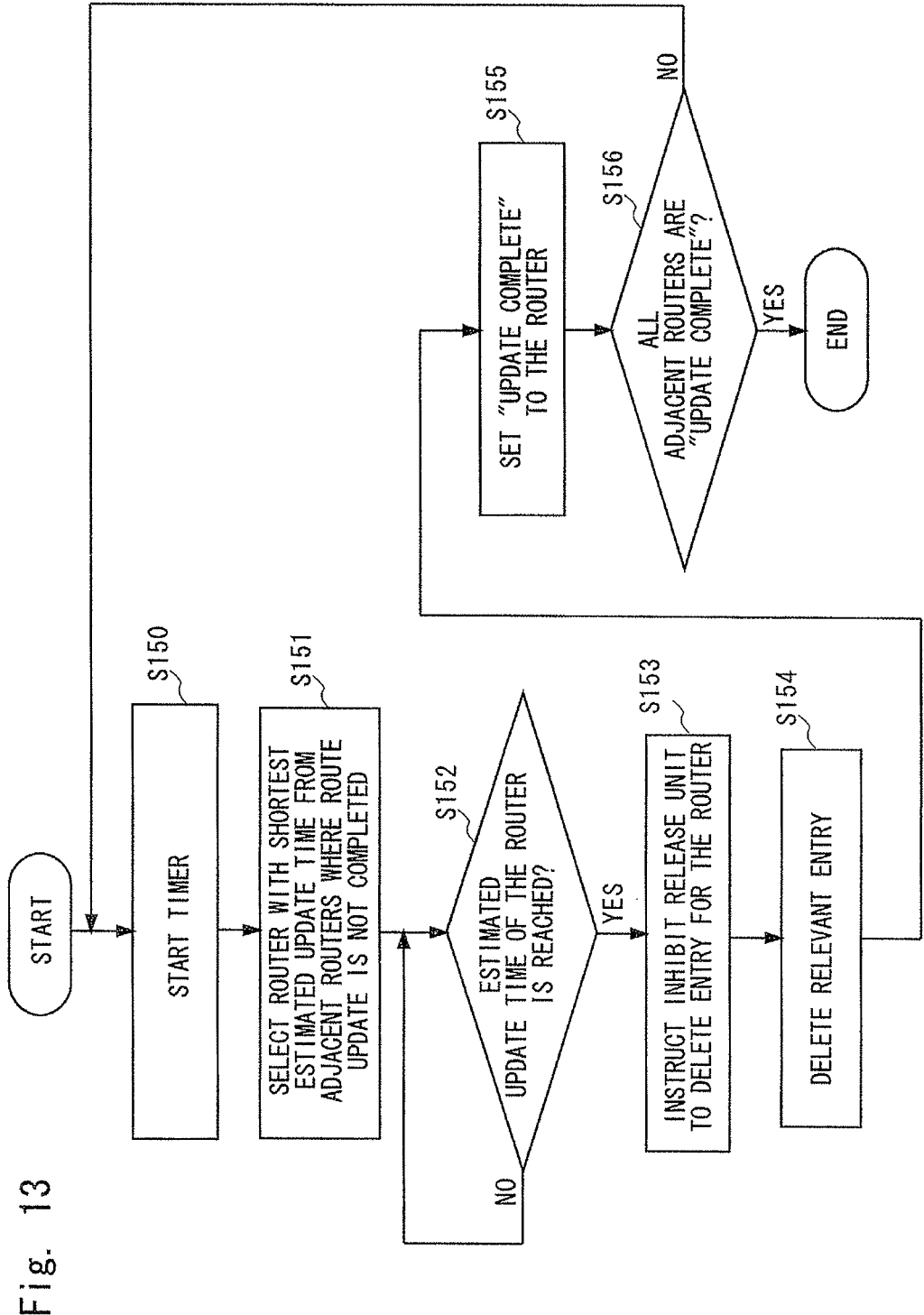
FIG. 13 is a flowchart showing a process of an inhibit control unit in the router shown in FIG. 12.

FIG. 13 is a flowchart showing a process of the inhibit control unit 260. First, when the start of update of the current routing table 221 of the router 250 is notified from the route calculation unit 232, the clocking unit 261 starts the timer 262 (S150). The management unit 263 selects a router in which route update is not yet completed among the adjacent routers and obtains an estimated value of the update time corresponding to the router (S151). Then, when the time of the timer 262 reaches the estimated value obtained in Step S151, the management unit 263 instructs the inhibit release unit 264 to delete an entry for the router (Yes in S152, No). Receiving the instruction, the inhibit release unit 264 deletes an entry in which the router is set as the next transfer destination from the inhibit target table 223 (S154). At the same time, the management unit 263 sets the state of the router to "update complete". (S155).

The processing from Step S151 to Step S155 is repeated until all adjacent routers become "update complete" (No in S156, S151).

In the router 250 according to the embodiment, the inhibit control unit 260 decides the timing to delete the entry of the inhibit target table 223 by estimating the completion time of route update of an adjacent router. Therefore, even when an adjacent router is a usual router to which the technique of the present invention is not applied, it is possible to avoid a micro-loop with the router. Specifically, if an IP network system is constructed by using the router 250 of this embodiment as either one of the two adjacent routers, the advantageous effect of the technique of the present invention described above, such as the reliable avoidance of a micro-loop, can be obtained.

Third Embodiment

Figure 14:
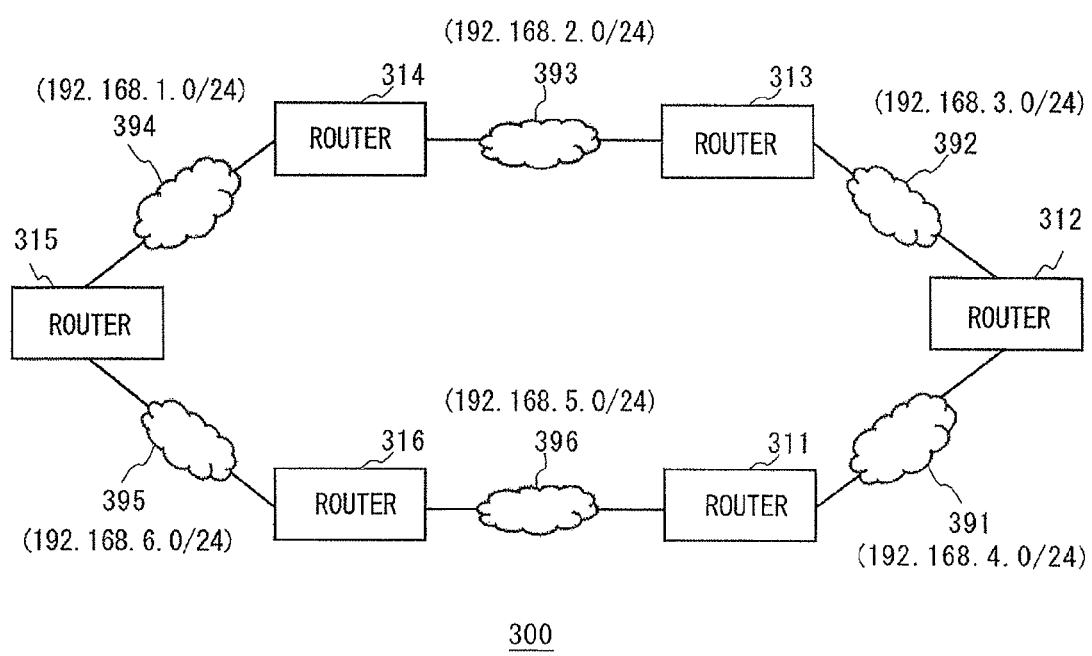
FIG. 14 is a view showing a network system according to a third embodiment of the present invention.

FIG. 14 shows a network system 300 according to a third embodiment of the present invention. The network system 300 is configured by connecting a plurality of routers (six in the illustrated example: a router 311 to a router 316) and a plurality of networks (six in the illustrated example: a network 391 to a network 396), and communication between the networks is relayed by the routers. Note that, in the example of FIG. 14, each router is connected with two networks.

Figure 25:
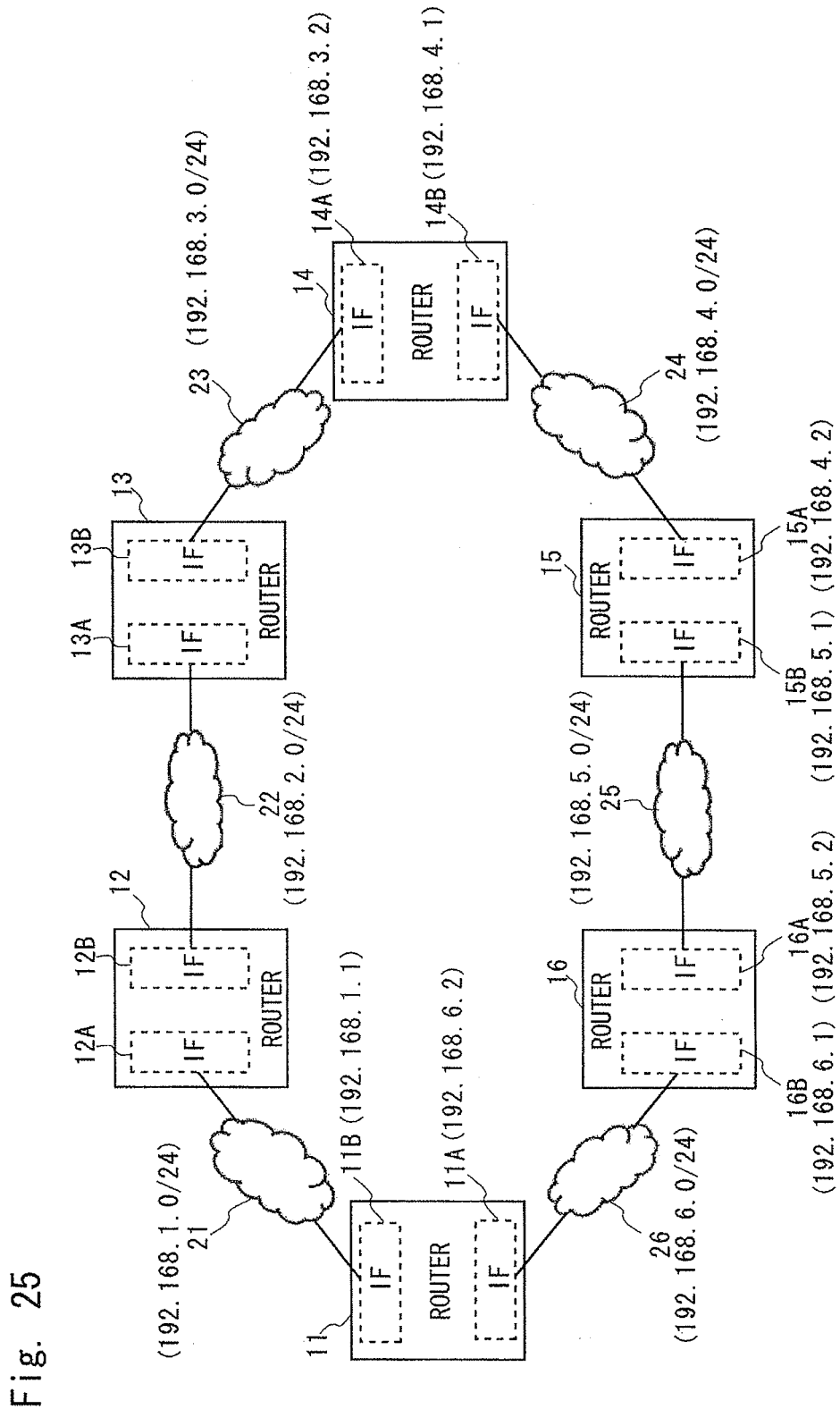
FIG. 25 is a view showing an example of an IP network system.

The six networks in the network system 300 are a network 391 (192.168.4.0/24), a network 392 (192.168.3.0/24), a network 393 (192.168.2.0/24), a network 394 (192.168.1.0/24), a network 395 (192.168.6.0/24) and a network 396 (192.168.5.0/24), which are respectively equivalent to the network 24, the network 23, the network 22, the network 21, the network 26 and the network 25 in the system 10 shown in FIG. 25.

The router 311 to the router 316 have the same configuration. Each router in the network system 300 is described hereinafter using the router 311 as a representative.

Figure 15:
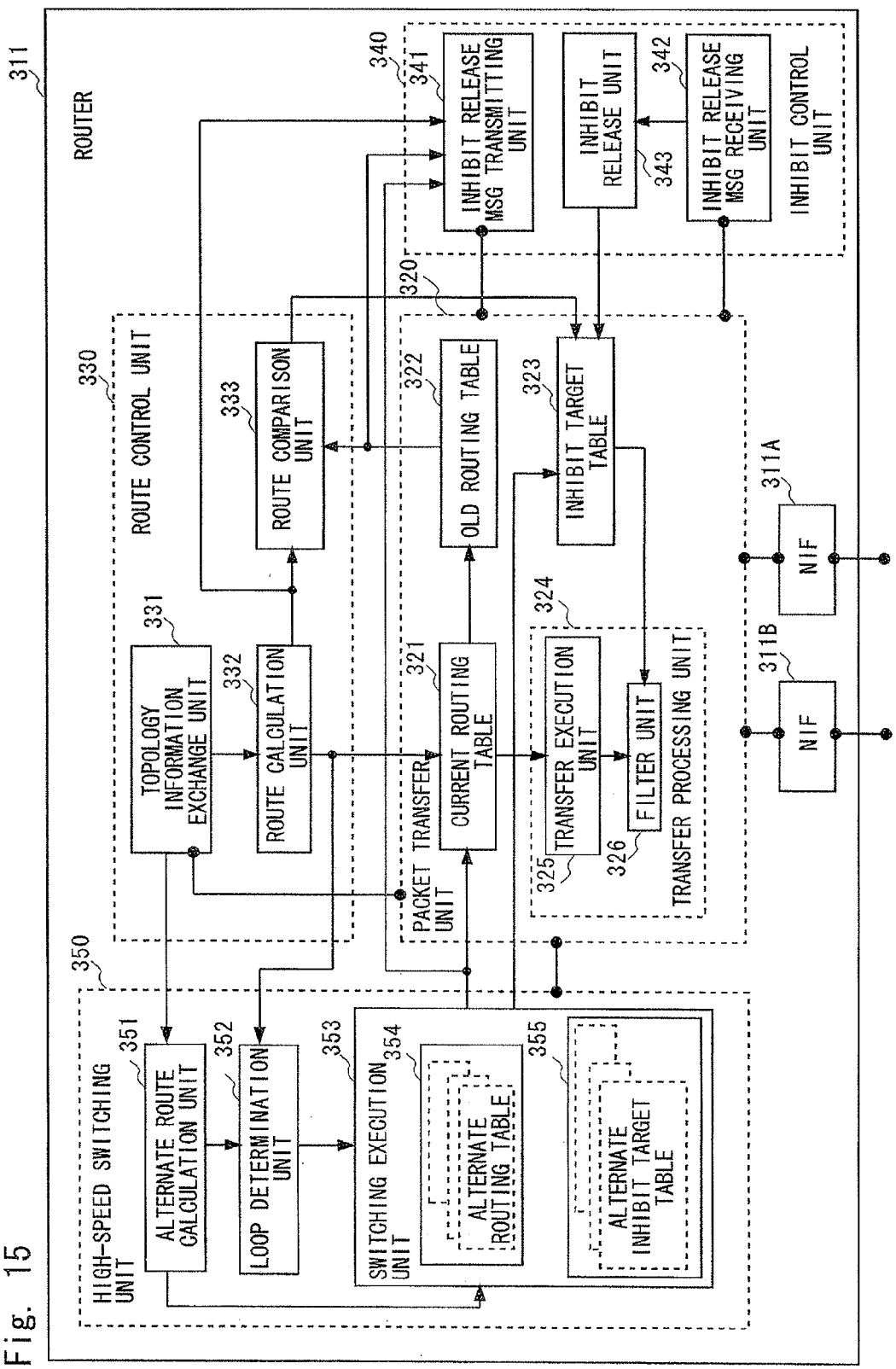
FIG. 15 is a view showing a router in the network system shown in FIG. 14.

FIG. 15 shows the router 311. The router 311 includes two network interfaces (NIF 311A, NIF 311B), a packet transfer unit 320, a route control unit 330, an inhibit control unit 340, and a high-speed switching unit 350.

The NIF 311A and the NIF 311B are connected with the network 391 (192.168.4.0/24) and the network 396 (192.168.5.0/24), respectively.

The packet transfer unit 320 includes a current routing table 321, an old routing table 322, an inhibit target table 323, and a transfer processing unit 324. The current routing table 321 is a routing table at the present time. The old routing table 322 is a routing table which is just previous to the current routing table 321. The inhibit target table 323 has a plurality of route entries, and registration of those route entries is performed by a route comparison unit 333, which is described later, of the route control unit 330 or a switching execution unit 353, which is described later, of the high-speed switching unit 350, and deletion is performed by an inhibit release unit 343, which is described later, of the inhibit control unit 340.

The transfer processing unit 324 performs the same operation as the transfer processing unit 224 in the packet transfer unit 220 of the router 210. Specifically, the transfer execution unit 325 specifies a transfer route of a packet based on the current routing table 321, and, for the route specified by the transfer execution unit 325, when its entry is registered in the inhibit target table 323, the filter unit 326 discards the packet, and when the entry of the route is not registered in the inhibit target table 323, the filter unit 326 transfers the packet.

The route control unit 330 includes a topology information exchange unit 331, a route calculation unit 332, and a route comparison unit 333. The topology information exchange unit 331 exchanges topology information with an adjacent router by a routing protocol, such as OSPF, for example. At the initialization of the router 311, the topology information exchange unit 331 outputs topology information to the packet transfer unit 320, the route calculation unit 332 and the high-speed switching unit 350 and, after that, when a change occurs in topology information, outputs a notification of the change and an output corresponding to the change to the packet transfer unit 320, the route calculation unit 332 and the high-speed switching unit 350.

The route calculation unit 332 calculates a route by using the topology information from the topology information exchange unit 331 at the initialization of the router 311. The route calculation unit 332 stores the calculated routing table into the current routing table 321 and outputs it to the high-speed switching unit 350 also. After that, when the route calculation unit 332 is notified of a failure in a link or another router in the network system 300 from the topology information exchange unit 331, if it determines that a route should be updated by itself, the route calculation unit 332 recalculates a route after removing a link or a router in which a failure occurs and updates the current routing table 321. Accordingly, a routing table that has been stored in the current routing table 321 is output as an old routing table to the old routing table 322, and the old routing table 322 is updated.

In this embodiment, the update of the current routing table 321 is performed by the route calculation unit 332 or the high-speed switching unit 350. When a failure occurs in an adjacent router of the router 311 and a direct link with the router 311, the high-speed switching unit 350 updates the current routing table 321, and when a failure occurs in the other parts, the route calculation unit 332 updates the current routing table 321.

The route calculation unit 332 checks whether the failed part is an adjacent router or a direct link of the router 311 based on failure information notified from the topology information exchange unit 331. If the failed part is a direct link or an adjacent router of the router 311, the route calculation unit 332 does not perform processing related to route update, such as recalculation of a route. Otherwise, the route calculation unit 332 recalculates a route and updates the current routing table 321 and outputs a new route to the route comparison unit 333 and the inhibit control unit 340.

The route comparison unit 333 compares the new route calculated by the route calculation unit 332 with the previous routing table stored in the old routing table 322, creates a route entry for a route in which a change occurs, and registers it into the inhibit target table 323.

The high-speed switching unit 350 performs update of a route when a failure occurs in a direct link or an adjacent router of the router 311, and it includes an alternate route calculation unit 351, a loop determination unit 352, and a switching execution unit 353. The switching execution unit 353 has an alternate routing table group 354 including a plurality of alternate routing tables and an alternate inhibit target table group 355 including a plurality of inhibit target tables (which is referred to hereinafter as alternate inhibit target tables). The respective alternate inhibit target tables included in the alternate inhibit target table group 355 respectively correspond to the respective alternate routes included in the alternate routing table group 354. Note that the alternate inhibit target table has the same structure as the inhibit target table 323, and entries indicating routes to be inhibited are stored therein.

At the initialization of the router 311, based on the topology information from the topology information exchange unit 331, assuming that a failure occurs in a direct link or an adjacent router of the router 311 in the network system 300, the alternate route calculation unit 351 calculates an alternate route with respect to each of the assumed failure parts and obtains an alternate routing table. The alternate route calculation unit 351 outputs each alternate routing table created in this manner to the loop determination unit 352 and stores them into the alternate routing table group 354 of the switching execution unit 353.

With respect to each alternate route obtained by the alternate route calculation unit 351, the loop determination unit 352 determines whether a micro-loop occurs or not by switching from the route calculated by the route calculation unit 332 to the alternate route. With respect to each alternate routing table, the loop determination unit 352 creates an entry only for the route which is determined that a micro-loop is likely to occur among the routes included in the alternate routing table to thereby obtain an alternate inhibit target table, and stores it into the alternate inhibit target table group 355.

Figures 16, 17:
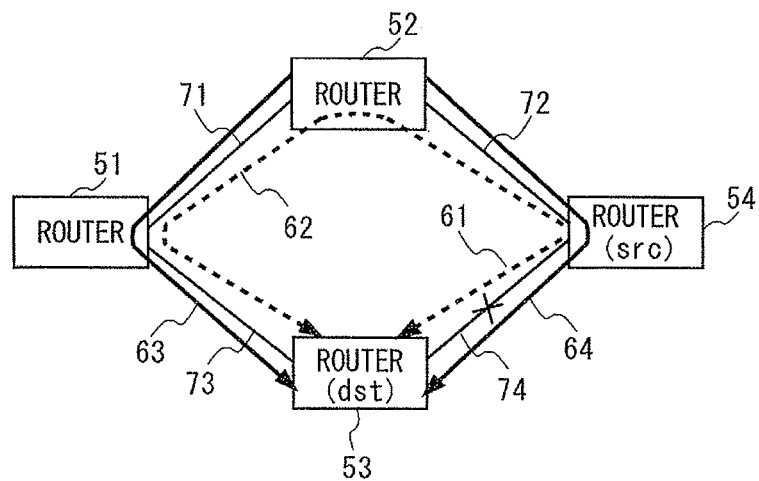
FIG. 16 is a (first) view to explain an algorithm that determines whether a micro-loop occurs or not by a loop determination unit of the router shown in FIG. 15.
FIG. 17 is a (second) view to explain an algorithm that determines whether a micro-loop occurs or not by a loop determination unit of the router shown in FIG. 15.

An algorithm of determination by the loop determination unit 352 is described hereinafter. An exemplary connection shown in FIG. 16 is used for easier understanding. Further, in the figure, the router 54 and the router 53 are a transmission source (src: source) and a transmission destination (dst: destination), respectively.

There are two routes from the router 54 to the router 53: a path 61 (the router 54→the router 53) and a path 62 (the router 54→the router 52→the router 51→the router 53). Before a failure occurs in a link 74, the path 61 is used as a transfer route because it is the shortest path. The cost of the path 61 is assumed to be "X".

When a failure occurs in the link 74, the path 62 is calculated as an alternate route, and the adjacent router 52 is selected as a next transfer destination router. Note that the cost of the path 62 is assumed to be "Y". At this time, it is necessary to find out which of a path 63 (the router 52→the router 51→the router 53) or a path 64 (the router 52→the router 54→the router 53) the router 52 is to use as the transfer route of a packet addressed to the router 53. Although a micro-loop does not occur if the path 63 is used, a micro-loop occurs if the path 64 is used.

If the cost of a link 72 between the router 54 and the router 52 is assumed to be "Z", the cost of the path 63 is "Y−Z", and the cost of the path 64 is "X+Z".

In this case, the path 63, rather than the path 64, is selected as a route to the router 53 in the router 52 when the cost of the path 63 is lower than the cost of the path 64, which is when the following expression (1) is satisfied.

$$(Y-Z)<(X+Z) \qquad (1)$$

Therefore, when the expression (1) is satisfied, it can be determined that an alternate route (path 62) in the router 54 does not form a micro-loop.

FIG. 17 shows the costs of the above-described paths and links and the condition in which a micro-loop does not occur.

Figure 18:
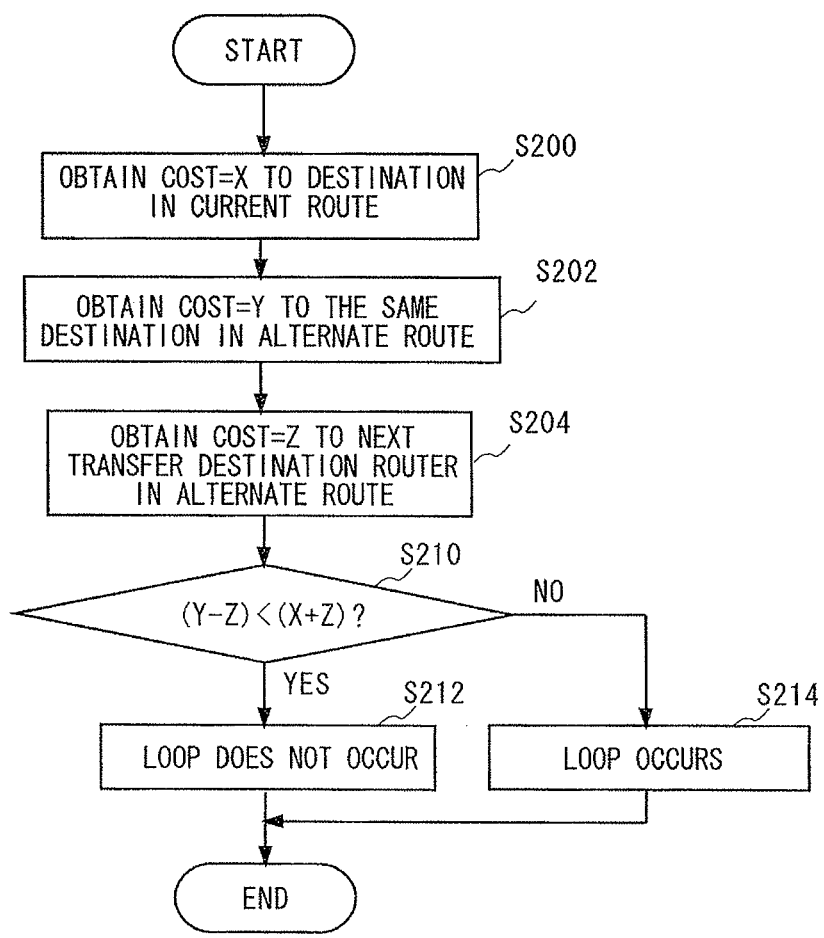
FIG. 18 is a flowchart showing a process that determines whether a micro-loop occurs or not by a loop determination unit of the router shown in FIG. 15.

The loop determination unit 352 of the router 311 in this embodiment determines whether switching to an alternate route forms a micro-loop or not by using the algorithm. FIG. 18 shows a flowchart of the determination process. The loop determination unit 352 acquires the cost to a destination in the current route and the cost to the same destination in an alternate route of the current route as "X" and "Y", respectively (S200, S202). Then, the loop determination unit 352 calculates "Y−Z" and "X+Z" by setting the cost to the next transfer destination router in the alternate route as "Z" (S204). The loop determination unit 352 determines that a micro-loop does not occur by switching to the alternate route when "Y−Z" and "X+Z" satisfy the above expression (1) (Yes in S210, S212), and determines that a micro-loop occurs when they do not satisfy the above expression (1) (No in S210, S214).

The loop determination unit 352 creates entries into an alternate inhibit target table only for the routes which are determined that a micro-loop is likely to occur for each of alternate routing tables, and registers them into the alternate inhibit target table in the alternate inhibit target table group 355 of the switching execution unit 353. Note that the alternate inhibit target tables in the alternate inhibit target table group 355 are respectively associated with the alternate routing tables in the alternate routing table group 354.

The switching execution unit 353 checks whether the failed part is a direct link or an adjacent router of the router 311 based on the failure information notified from the topology information exchange unit 331. If the failed part is not a direct link or an adjacent router of the router 311, it does not perform the route update process. On the other hand, if the failed part is a direct link or an adjacent router of the router 311, the switching execution unit 353 reads the alternate routing table corresponding to the failed part from the alternate routing table group 354 and updates the current routing table 321, and reads the alternate inhibit target table corresponding to the alternate routing table from the alternate inhibit target table group 355 and registers it into the inhibit target table 323. Accordingly, a routing table that has been stored in the current routing table 321 is output as an old routing table to the old routing table 322, and the old routing table 322 is updated.

Thus, in this embodiment, immediately after the initialization of the router 311, the routing table obtained by the route calculation unit 332 is stored in the current routing table 321, the alternate routing table with respect to each failed part when it is assumed that a failure occurs in a direct link or an adjacent router of the router 311 is stored in the alternate routing table group 354, and the alternate inhibit target table corresponding to the alternate routing table is stored in the alternate inhibit target table group 355 with respect to each alternate routing table stored in the alternate routing table group 354. Note that, in the alternate inhibit target table, an entry is registered only for a route in which a micro-loop is likely to occur at the time of switching to the corresponding alternate routing table. Note that nothing is registered in the inhibit target table 323.

During the operation of the router 311, when the topology information exchange unit 331 recognizes that a failure occurs in another router or a link, it notifies that to the route calculation unit 332 and the switching execution unit 353.

When the route calculation unit 332 determines that a route should be updated by itself based on the failure information from the topology information exchange unit 331, it calculates a new routing table and updates the current routing table 321, and further outputs the new routing table to the route comparison unit 333 and the inhibit control unit 340. The route comparison unit 333 compares the new and old routing tables, creates an entry for a route in which a change has occurred, and registers it into the inhibit target table 323. Note that the route calculation unit 332 does not perform the above processing when it determines that a route should not be updated by itself.

When the switching execution unit 353 in the high-speed switching unit 350 determines that a route should be updated by itself based on the failure information from the topology information exchange unit 331, it reads the alternate routing table from the alternate routing table group 354 and updates the current routing table 321, and further reads the alternate inhibit target table corresponding to the alternate routing table from the alternate inhibit target table group 355 and registers it into the inhibit target table 323. Further, the switching execution unit 353 outputs the new routing table (alternate routing table) also to the inhibit control unit 340.

The inhibit control unit 340 includes an inhibit release MSG transmitting unit 341, an inhibit release unit 343, and an inhibit release MSG receiving unit 342. The inhibit release MSG transmitting unit 341 has a function of transmitting an inhibit release MSG to an adjacent router, and the inhibit release MSG receiving unit 342 and the inhibit release unit 343 have a function of deleting a route entry registered in the inhibit target table 323.

The inhibit release MSG receiving unit 342 and the inhibit release unit 343 perform the same operations as the inhibit release MSG receiving unit 242 and the inhibit release unit 243 in the inhibit control unit 240 of the router 210 shown in FIG. 6. Specifically, the inhibit release MSG receiving unit 342 receives an inhibit release MSG from an adjacent router and outputs it to the inhibit release unit 343. The inhibit release unit 343 deletes a relevant entry from the inhibit target table 323 based on the inhibit release MSG from the inhibit release MSG receiving unit 342.

The inhibit release MSG transmitting unit 341 transmits an inhibit release MSG to an adjacent router when update of the current routing table 321 is completed by the route calculation unit 332 or the switching execution unit 353. The operation of the inhibit release MSG transmitting unit 341 is described hereinafter with reference to FIG. 19.

Figure 19:
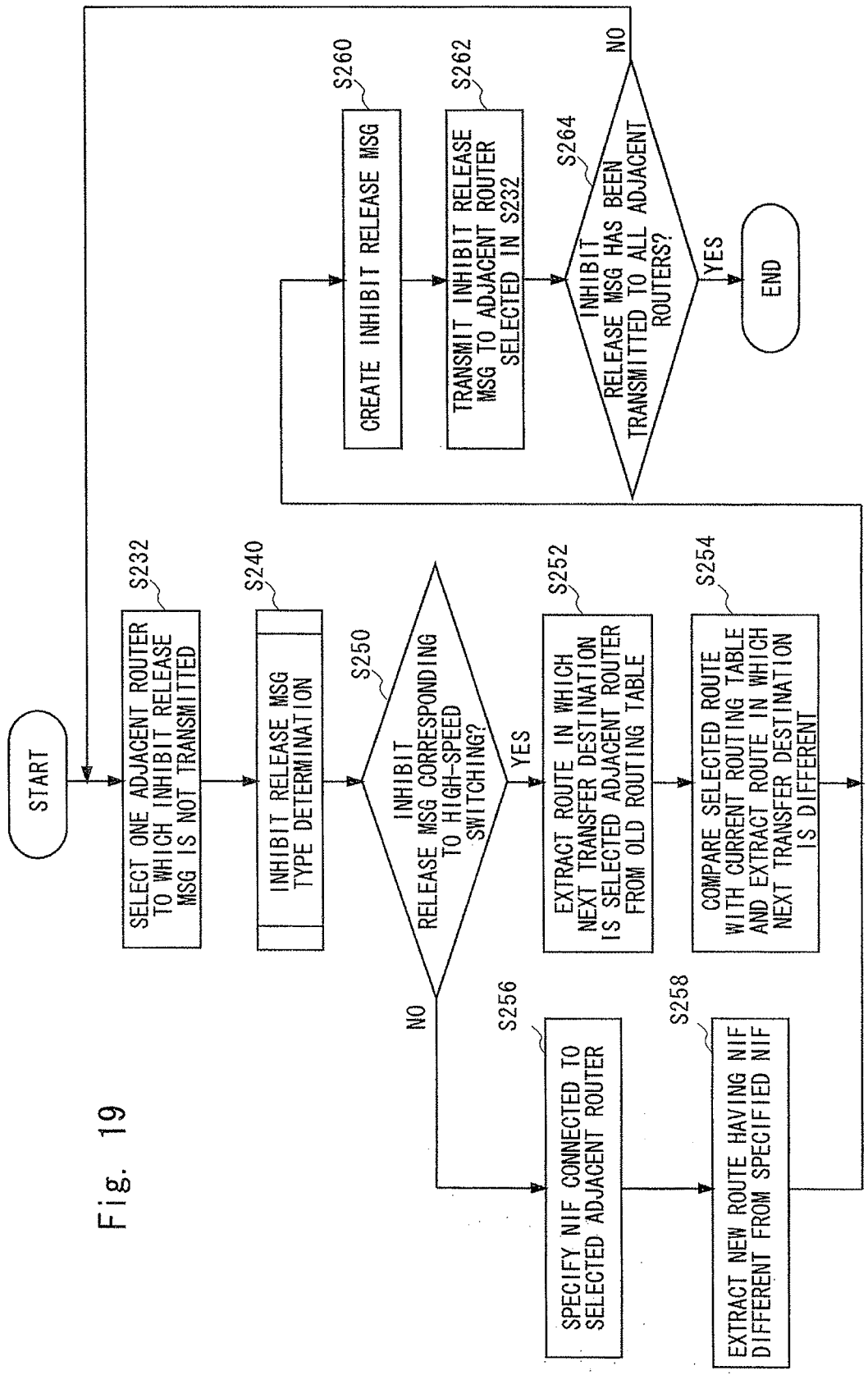
FIG. 19 is a flowchart showing a process of an inhibit release MSG transmitting unit of the router shown in FIG. 15.

FIG. 19 is a flowchart showing the inhibit release MSG transmission process by the inhibit release MSG transmitting unit 341. As shown therein, the inhibit release MSG transmitting unit 341 first selects one router to which an inhibit release MSG has not been transmitted from the adjacent routers (the router 312 and the router 316 in the example of the network system 300 shown in FIG. 14) (S232). Then, the inhibit release MSG transmitting unit 341 determines the type of the inhibit release MSG to be transmitted to the selected router (S240). In this embodiment, the inhibit release MSG transmitting unit 341 determines either one of "inhibit release MSG corresponding to high-speed switching" or "inhibit release MSG not corresponding to high-speed switching". The "inhibit release MSG corresponding to high-speed switching" is transmitted to an adjacent router that executes high-speed switching, and the "inhibit release MSG not corresponding to high-speed switching" is transmitted to an adjacent router that does not execute high-speed switching. The detail of the determination process is described later.

When the adjacent router selected in Step S232 is a router to which an inhibit release MSG corresponding to high-speed switching should be transmitted (Yes in S250), the inhibit release MSG transmitting unit 341 extracts all routes in which the next transfer destination is the adjacent router selected in Step S232 from the old routing table 322 (S252). Then, the inhibit release MSG transmitting unit 341 compares the alternate routing table (which is the same as the one stored in the current routing table 321) from the switching execution unit 353 with the routes extracted in Step S252 and extracts a route in which the destination is the same and the next transfer destination is different between them (S254).

On the other hand, when the adjacent router selected in Step S232 is a router to which an inhibit release MSG corresponding to high-speed switching should not be transmitted (No in S250), the inhibit release MSG transmitting unit 341 specifies an interface (NIF) which is connected to the adjacent router (S256). The inhibit release MSG transmitting unit 341 then extracts all routes having the "interface" which is different from the NIF specified in Step S256 from the routes contained in the new routing table (S258). Note that the processing of Step S256 to Step S258 is the same as Step S134 to Step S136 in FIG. 9 which shows the process of the inhibit release MSG transmitting unit 241 in the router 210.

The inhibit release MSG transmitting unit 341 creates an inhibit release MSG by using the route extracted in Step S254 or the route extracted in Step S258 and transmits it to the adjacent router selected in Step S232 (S260, S262). Note that the creation and the transmission of an inhibit release MSG in Step S260 and Step S262 are the same as the relevant processing in the inhibit release MSG transmitting unit 241 in the router 210.

When the inhibit release MSG transmitting unit 341 transmits the inhibit release MSG to all adjacent routers (Yes in S264), the process ends.

As known from comparison between the process of the inhibit release MSG transmitting unit 341 shown in the flowchart of FIG. 19 and the process of the inhibit release MSG transmitting unit 241 in the router 210 shown in the flowchart of FIG. 9, in this embodiment, when an adjacent router does not execute high-speed switching, the inhibit release MSG transmitting unit 341 performs the same processing as that of the inhibit release MSG transmitting unit 241 in the router 210, and when an adjacent router executes high-speed switching, the inhibit release MSG transmitting unit 341 creates an inhibit release MSG corresponding to high-speed switching. Note that the inhibit release MSG corresponding to high-speed switching is the same as the inhibit release MSG not corresponding to high-speed switching except that a route to be inhibited is different.

This is described in detail by using the case where the router 311 transmits an inhibit release MSG to the router 316 in the network system 300 as an example. This is the case where the inhibit release MSG transmitting unit 341 selects the router 316 as an adjacent router in Step S232.

FIG. 20 shows routing tables which are stored in the current routing table 321 of the router 311 and the router 316, respectively, immediately after the initialization of the network system 300. Note that, in the figure, 311A and 311B are NIFs of the router 311 which are connected with the network 391 (192.168.4.0/24) and the network 396 (192.168.5.0/24), respectively, and 316A and 316B are NIFs of the router 316 which are connected with the network 396 (192.168.5.0/24) and the network 395 (192.168.6.0/24), respectively.

FIG. 21 shows routing tables after update of the router 316 and the router 311 when a failure occurs in the router 315 or the network 395 in the network system 300. As known from comparison between FIG. 20 and FIG. 21, in the router 316, routes in which a change occurs before and after update are two routes whose destinations are the network 394 (192.168.1.0/24) and the network 393 (192.168.2.0/24).

When the router 316 executes high-speed switching (i.e. when a failure occurs in a direct link or an adjacent router of the router 316), only the route which is likely to form a micro-loop among the two routes described above is registered in the inhibit target table of the router 316. In this case, for the route in which the next transfer destination is not the router 316 in the old routing table of the router 311, it is determined to be a route in which a micro-loop does not occur on the router 316 side, and it is thus not set as an inhibit target. The route in which the destination is the network 393 (192.168.02.0/24) in the old routing table of the router 311 shown in FIG. 20 corresponds thereto. As shown in FIG. 20 and FIG. 21, in the router 316, the route to the network 393 (192.168.02.0/24) is changed from 192.168.6.2 (the router 315) to 192.168.5.1 (the router 311) before and after the update. However, as known from the routing table of the router 311, the next transfer destination router in the route whose destination is the network 393 (192.168.2.0/24) is not the router 316 both before and after update, and it can be determined that a loop does not occur. Therefore, at the time of high-speed switching, on the router 316 side, only the entry in which the destination is the network 394 (192.168.1.0/24) is registered in the inhibit target table.

Thus, when the router 311 transmits an inhibit release MSG to the router 316, if it determines that the router 316 is conducting high-speed switching, the router 311 may create and transmit the inhibit release MSG only for the route whose destination is the network 394 (192.168.1.0/24).

On the other hand, when the router 316 does not execute high-speed switching, the router 311 cannot figure out which route is set as an inhibit target in the router 316, and therefore transmits an inhibit release MSG to all the routes in which the interface is 311A, which are, the four routes in which the network 394 (192.168.1.0/24), the network 393 (192.168.2.0/24), the network 392 (192.168.3.0/24) and the network 391 (192.168.4.0/24) are set as the destination.

Figure 22:
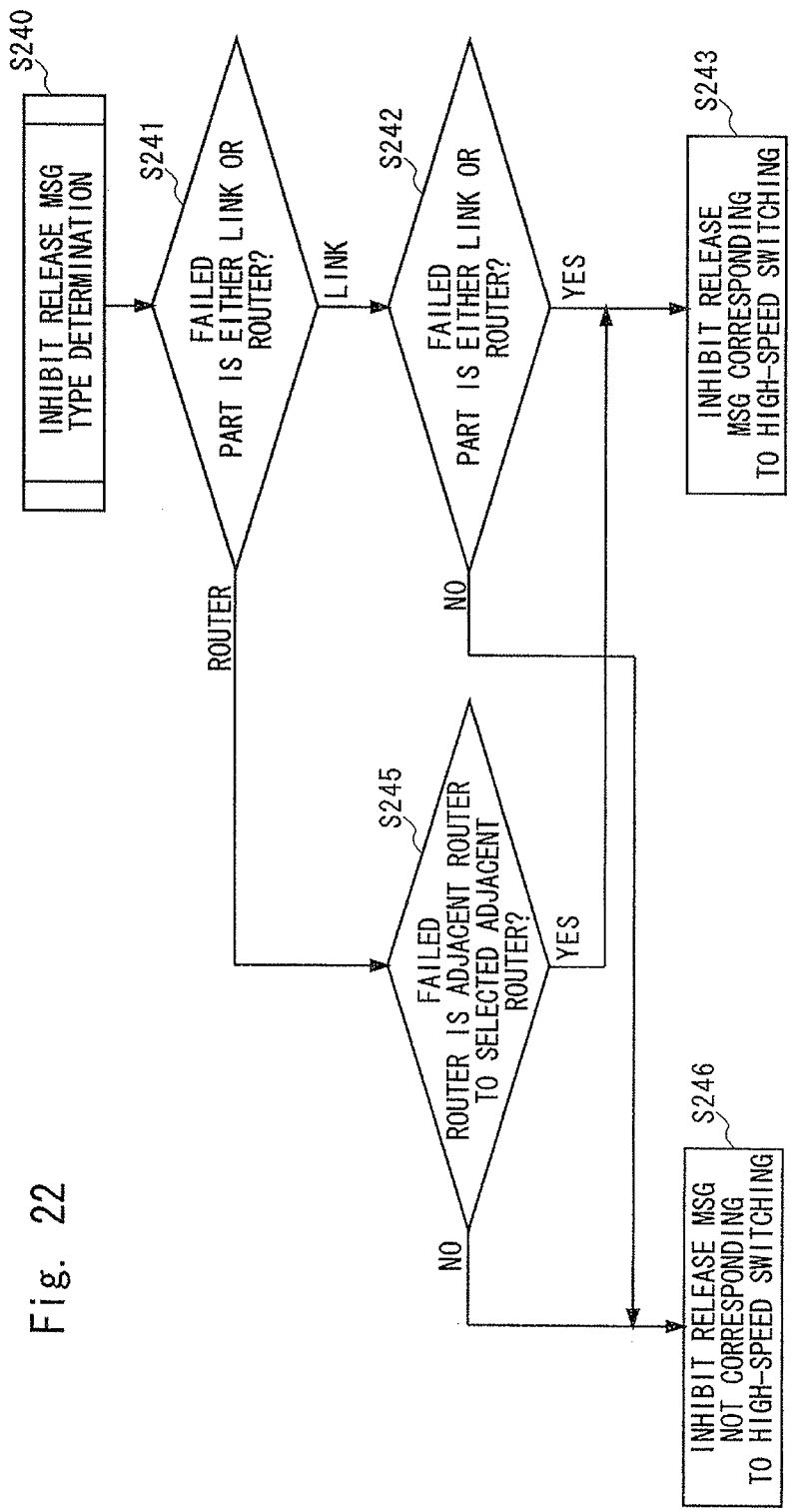
FIG. 22 is a flowchart showing Step S240 of FIG. 19 in detail.

FIG. 22 is a flowchart showing the detail of the determination processing in Step S240 of FIG. 19. As shown in FIG. 21, in the inhibit release MSG type determination, the inhibit release MSG transmitting unit 341 first determines whether a failure part is a link or a router based on the topology information from the topology information exchange unit 331 (S241). When the failure part is a router, the inhibit release MSG transmitting unit 341 further determines whether the failed router is an adjacent router of the adjacent router selected in Step S232 of FIG. 19 (Router in S241, S245).

If the failed router is an adjacent router of the adjacent router selected in Step S232 of FIG. 19, it means that the adjacent router selected in Step S232 executes high-speed switching. Therefore, when the inhibit release MSG transmitting unit 341 determines that the failed router is an adjacent router of the adjacent router selected in Step S232, it determines the type of the inhibit release MSG to be transmitted as "inhibit release MSG corresponding to high-speed switching" (Yes in S245, S243). On the other hand, when the inhibit release MSG transmitting unit 341 determines that the failed router is not an adjacent router of the adjacent router selected in Step S232, it determines the type of the inhibit release MSG to be transmitted as "inhibit release MSG not corresponding to high-speed switching" (No in S245, S246).

When it is determined in Step S241 that the failure part is a link (Link in S241), the inhibit release MSG transmitting unit 341 further checks whether the failed link is a direct link with the adjacent router selected in Step S232 of FIG. 19 (Link in S241, S242).

If the failed link is a direct link with the adjacent router selected in Step S232 of FIG. 19, it means that the adjacent router selected in Step S232 executes high-speed switching. Therefore, when the inhibit release MSG transmitting unit 341 determines that the failed link is a direct link with the adjacent router selected in Step S232, it determines the type of the inhibit release MSG to be transmitted as "inhibit release MSG corresponding to high-speed switching" (Yes in S242, S243). On the other hand, when the inhibit release MSG transmitting unit 341 determines that the failed link is not a direct link with the adjacent router selected in Step S232, it determines the type of the inhibit release MSG to be transmitted as "inhibit release MSG not corresponding to high-speed switching" (No in S242, S246).

In the network system 300 according to the embodiment, each router has a high-speed switching function and, when a failure occurs in a direct link or an adjacent router, the current routing table is updated by using the alternate routing table which is prepared in advance, thereby enabling high-speed route update. Further, when transmitting an inhibit release MSG to an adjacent router after route update, if it is determined that the adjacent router is a router that performs high-speed switching, an inhibit release MSG corresponding to high-speed switching is transmitted, thereby reducing the number of routes to notify inhibit release by the inhibit release MSG compared to the router 210 in the network system 200 according to the first embodiment.

If high-speed switching is performed when a failure occurs in an arbitrary link and router of a network system, it is necessary to prepare an enormous number of alternate routing tables; therefore, in the network system 300 according to the embodiment, each router executes high-speed switching only when a failure occurs in a direct link or an adjacent router. For example, in the case of a network system with a small number of routers or links, each router may execute high-speed switching when a failure occurs in any place of the system. In this case, an inhibit release MSG to an adjacent router is all "inhibit release MSG corresponding to high-speed switching".

Further, in this embodiment, although the router 311 deletes an entry in the inhibit target table 323 according to an inhibit release MSG received from an adjacent router, it is feasible to estimate the time when an adjacent router completes route update and, upon reaching the estimated time, delete a route entry corresponding to the adjacent router from the inhibit target table 323.

Fourth Embodiment

Figure 23:
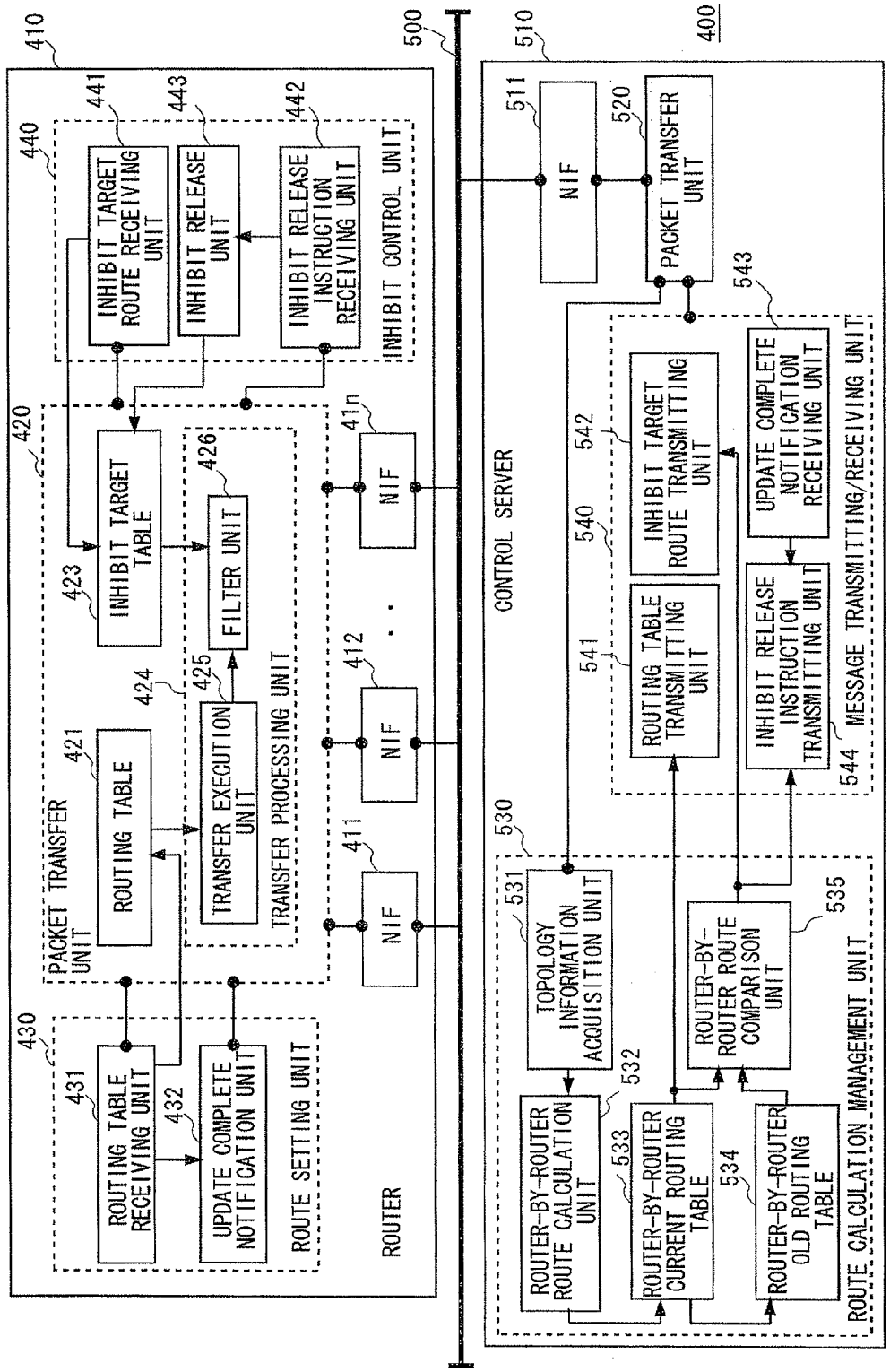
FIG. 23 is a view showing a network system according to a fourth embodiment of the present invention.

FIG. 23 shows a network system 400 according to a fourth embodiment of the present invention. The network system 400 includes a plurality of networks, and a plurality of routers that relay communication between the plurality of networks. In FIG. 23, for easier understanding, the plurality of networks are collectively shown as a network 500, and only a router 410 among the routers is shown. The routers which are not shown have the same configuration as the router 410.

The network system 400 includes a control server 510 which is connected with the network 500. The control server 510 controls the route of each router in the network system 400. As shown therein, the control server 510 includes a network interface (NIF) 511 for connection with the network 500, a packet transfer unit 520 that performs transfer of a packet addressed to the control server 510 and a packet sent out from the control server 510, a route calculation management unit 530, and a message transmitting/receiving unit 540.

The route calculation management unit 530 includes a topology information acquisition unit 531, a topology information acquisition unit 531, a router-by-router route calculation unit 532, a router-by-router current routing table 533, a router-by-router old routing table 534, and a router-by-router route comparison unit 535. The topology information acquisition unit 531 acquires topology information from the network 500 and supplies the information to the router-by-router route calculation unit 532. The router-by-router route calculation unit 532 creates a routing table of each router connected to the network 500 based on the topology information acquired by the topology information acquisition unit 531 and outputs the routing table to the router-by-router current routing table 533, and further transmits it to each router through a routing table transmitting unit 541, which is described later, in the message transmitting/receiving unit 540. Further, when receiving topology information indicating a failure part from the topology information acquisition unit 531, the router-by-router route calculation unit 532 creates a new routing table for each router and updates the current routing table of each router stored in the router-by-router current routing table 533 and transmits the new routing table to each router through the routing table transmitting unit 541.

Each time the router-by-router current routing table 533 receives a new routing table from the router-by-router route calculation unit 532, it outputs the stored current routing table of each router as an old routing table to the router-by-router old routing table 534 and also stores the new routing table from the router-by-router route calculation unit 532. Further, the router-by-router current routing table 533 outputs the stored new routing table to the routing table transmitting unit 541 and the router-by-router route comparison unit 535.

The router-by-router old routing table 534 updates the stored old routing table to the routing table (old routing table) which is output from the router-by-router current routing table 533. Further, the router-by-router old routing table 534 outputs the updated old routing table to the router-by-router route comparison unit 535.

Thus, the latest routing table of each router is stored in the router-by-router current routing table 533, and the routing table which is just previous to the routing table stored in the router-by-router current routing table 533 is stored in the router-by-router old routing table 534.

The router-by-router route comparison unit 535 compares the current routing table which is stored in the router-by-router current routing table 533 and the old routing table which is stored in the router-by-router old routing table 534 with respect to each router and extracts an inhibit target route. The extraction processing extracts the route in which a change has occurred, which is the route in which "destination network" is the same and "next transfer destination" is different between the new and old routing tables, like the equivalent processing in each of the embodiments described earlier.

The router-by-router route comparison unit 535 outputs information indicating the extracted inhibit target route (which is referred to hereinafter as inhibit target route information) to an inhibit target route transmitting unit 542 and an inhibit release instruction transmitting unit 544, which are described later, in the message transmitting/receiving unit 540.

The message transmitting/receiving unit 540 includes a routing table transmitting unit 541, an inhibit target route transmitting unit 542, an update complete notification receiving unit 543, and an inhibit release instruction transmitting unit 544.

Each time the routing table transmitting unit 541 receives a new routing table for each router from the router-by-router current routing table 533, it transmits the new routing table of each router to the relevant router. Each time the inhibit target route transmitting unit 542 receives inhibit target route information for each router from the router-by-router route comparison unit 535, it transmits the inhibit target route information of each router to the relevant router.

In this embodiment, each router transmits an update complete notification to the control server 510 upon completion of update of a route in the router. The update complete notification is described in detail later when describing the router 410. The update complete notification receiving unit 543 in the message transmitting/receiving unit 540 of the control server 510 receives the update complete notification and notifies the transmission source router (which is referred to hereinafter as a complete notification transmission source router) to the inhibit release instruction transmitting unit 544.

The inhibit release instruction transmitting unit 544 transmits an instruction for releasing an inhibit target route (inhibit release instruction) about the complete notification transmission source router to an adjacent router of the complete notification transmission source router which is notified from the update complete notification receiving unit 543.

Note that the transmission of a routing table, the transmission of an inhibit target route, the reception of an update complete notification and the transmission of an inhibit release instruction which are performed by the message transmitting/receiving unit 540 are made through the packet transfer unit 520 and the NIF 511.

Hereinafter each router in the network system 400 is described, using the router 410 as a representative. The router 410 includes two or more NIFs (NIF 411, NIF 412, ..., NIF 41n) which are respectively connected with two or more networks included in the network 500, a packet transfer unit 420, a route setting unit 430, and an inhibit control unit 440. The transfer of a packet addressed to the router 410 and a packet sent out from the router 410 is performed through the NIF and the packet transfer unit 420.

The route setting unit 430 includes a routing table receiving unit 431 and an update complete notification unit 432, and performs setting (including update) of a route of the router 410 and notification of completion of route update to the control server 510. Specifically, each time the routing table receiving unit 431 receives its routing table from the control server 510, it outputs the routing table to a routing table 421, which is described later, of the packet transfer unit 420. Further, each time the routing table receiving unit 431 has output the routing table which has been received in the second time or after to the routing table 421, it notifies the update complete notification unit 432 that route update has been made. When the update complete notification unit 432 is notified that route update has been made from the routing table receiving unit 431, it transmits an update complete notification to the control server 510 and notifies that route update is completed in the router 410.

The packet transfer unit 420 includes a routing table 421, an inhibit target table 423, and a transfer processing unit 424. Each time a routing table is received from the routing table receiving unit 431, the routing table 421 updates the stored routing table to the received routing table. The inhibit target table 423 receives inhibit target route information from the inhibit control unit 440 and stores the information. Note that the inhibit target route information is transmitted from the inhibit target route transmitting unit 542 in the message transmitting/receiving unit 540 of the control server 510 and received by an inhibit target route receiving unit 441, which is described later, of the inhibit control unit 440.

The transfer processing unit 424 includes a transfer execution unit 425 and a filter unit 426, and performs transfer of a packet by referring to the routing table 421 and the inhibit target table 423. The transfer processing unit 424 performs the same operation as the transfer processing unit 224 in the packet transfer unit 220 of the router 210 shown in FIG. 6, and detailed explanation thereof is omitted.

The inhibit control unit 440 includes an inhibit target route receiving unit 441, an inhibit release instruction receiving unit 442 and an inhibit release unit 443.

The inhibit target route receiving unit 441 receives inhibit target route information from the control server 510, specifically, the inhibit target route transmitting unit 542 of the control server 510, and outputs the received inhibit target route information to the inhibit target table 423. Accordingly, upon route update of the router 410, a route entry to be inhibited is registered into the inhibit target table 423.

The inhibit release instruction receiving unit 442 receives an inhibit release instruction from the control server 510, specifically, the inhibit release instruction transmitting unit 544 in the message transmitting/receiving unit 540 of the control server 510, and notifies the inhibit release unit 443 of a route for a router indicated by the received inhibit release instruction.

The inhibit release unit 443 deletes an entry corresponding to the route notified from the inhibit release instruction receiving unit 442 from the inhibit target table 423.

Figure 24:
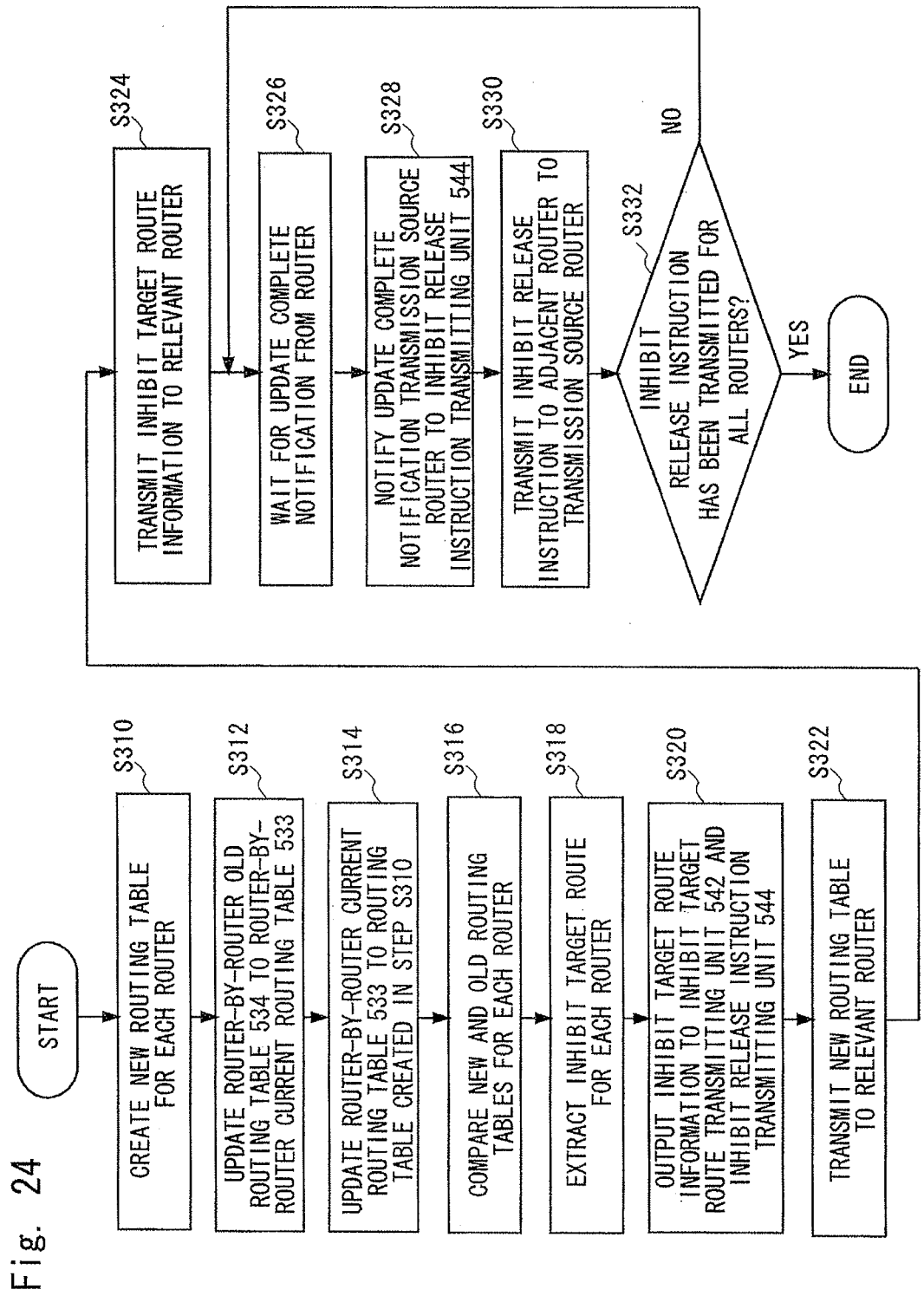
FIG. 24 is a flowchart showing an operation of a control server in the network system shown in FIG. 23 when a change occurs in topology information.

FIG. 24 is a flowchart showing an operation of the control server 510 when topology information of the network system 400 changes and it is necessary to update a routing table of each router. As shown in FIG. 24, in order to update the route of each router on the network 500, the router-by-router route calculation unit 532 first creates a new router-by-router routing table (S310). A routing table for each router which has been stored in the router-by-router current routing table 533 is thereby output as an old routing table to the router-by-router old routing table 534, and the router-by-router old routing table 534 is updated. Accordingly, the router-by-router current routing table 533 is updated to a new routing table created in Step S310 (S312, S314). The router-by-router route comparison unit 535 compares the new and old routing tables with respect to each router and extracts an inhibit target route based on the comparison result (S318). The router-by-router route comparison unit 535 outputs inhibit target route information indicating the extracted inhibit target route to the inhibit target route transmitting unit 542 and the inhibit release instruction transmitting unit 544 (S320). Then, the routing table transmitting unit 541 transmits the new routing table from the router-by-router current routing table 533 to the relevant router, and the inhibit target route transmitting unit 542 transmits the inhibit target route information from the router-by-router route comparison unit 535 to the relevant router (S322, S324).

The inhibit release instruction transmitting unit 544 holds the inhibit target route information of each router received from the router-by-router route comparison unit 535 and waits for an update complete notification from each router (S326). When the update complete notification receiving unit 543 receives an update complete notification from any router and notifies the complete notification transmission source router to the inhibit release instruction transmitting unit 544, the inhibit release instruction transmitting unit 544 transmits an inhibit release instruction to each adjacent router of the complete notification transmission source router (S330). Note that the inhibit release instruction may be the same format as the inhibit release MSG which is used in each of the embodiments described earlier. Further, because the inhibit release instruction transmitting unit 544 holds the inhibit target route of each router, the inhibit release instruction transmitted to an adjacent router of the complete notification transmission source router may contain only the route which is set as an inhibit target in the adjacent router for the complete notification transmission source router.

The inhibit release instruction transmitting unit 544 checks whether an inhibit release instruction has been transmitted to an adjacent router of all routers, i.e. whether route update is completed in all routers (S332). If there is a router in which route update has not been completed, the process returns to Step S326 (No in S332, S326), and if route update is completed in all routers (Yes in S332), the process ends.

In a network system that controls route update of all routers by one control server rather than performing route control by a router itself also, there is a possibility that a micro-loop occurs due to a difference in timing of route update between adjacent routers. In the network system 400 of this embodiment, the control server 510 transmits a new routing table to each router and further transmits inhibit target route information thereto. Each router updates an old routing table to the new routing table received from the control server 510 and further registers the inhibit target route information into the inhibit target table. Then, when the transfer processing unit of the router transfers a packet, it executes transfer of a packet on condition that a transfer route of the packet is not registered in the inhibit target table. It is thereby possible to avoid a micro-loop even if the route update timing is different between adjacent routers. Further, the control server 510 transmits an inhibit release instruction to an adjacent router of a router in which route update is completed (complete notification transmission source router), and the adjacent router which has received the inhibit release instruction deletes a route entry for the complete notification transmission source router from the inhibit target table. Therefore, when the possibility that a micro-loop occurs is eliminated, the router becomes available for transfer of all packets.

Although the present invention is described above with reference to the embodiments (and modes for the invention), the present invention is not limited to the above-described embodiments (and modes for the invention). Various changes and modifications as would be obvious to one skilled in the art may be made to the configuration and the details of the present invention without departing from the scope of the invention.

This application is based upon and claims the benefit of priority from Japanese patent application No. 2008-111582 filed on Apr. 22, 2008, the disclosure of which is incorporated herein in its entirety by reference.

INDUSTRIAL APPLICABILITY

The present invention may be applied to a route switching technique in a network system, for example.

The invention claimed is:

1. A relay device in a network system where communication between a plurality of networks is relayed by a plurality of relay devices, comprising:
a plurality of network interfaces that are respectively connected to networks with adjacent relay devices;
a current routing table storage unit that stores a routing table where a destination and a next transfer destination being any adjacent relay device are associated;
a route control unit that, when a failure occurs in a link or another relay device in the network system, updates the routing table stored in the current routing table storage unit and, upon update, acquires inhibit target route information on a route that generates a micro-loop in the routing table after update;
an inhibit target table that stores the inhibit target route information;
an inhibit control unit that, on condition that route update in an adjacent relay device is completed, deletes a route in which the adjacent relay device is set as a next transfer destination from the inhibit target table; and
a transfer processing unit that determines a transfer route of a packet based on the routing table stored in the current routing table storage unit and, on condition that the determined transfer route of the packet is not registered in the inhibit target table, executes transfer of the packet.

2. The relay device according to claim 1, wherein the route control unit compares the routing tables before and after update and acquires the inhibit target route information from a comparison result.

3. The relay device according to claim 1, wherein the route control unit acquires the inhibit target route information by obtaining a route in which a destination is the same and a next transfer destination is different between the routing tables before and after update as an inhibit target route.

4. The relay device according to claim 1, wherein the inhibit control unit transmits a route update complete notification to each adjacent relay device after completion of update of the routing table stored in the current routing table storage unit.

5. The relay device according to claim 4, wherein the inhibit control unit creates an inhibit release message indicating a route for which inhibit should be released in an adjacent relay device as a transmission destination of the route update complete notification by completion of update of the routing table stored in the current routing table storage unit and transmits the inhibit release message as the route update complete notification to the adjacent relay device.

6. The relay device according to claim 5, wherein the inhibit control unit creates and transmits the inhibit release message indicating a route where a destination of a route in which a network interface connected to a network with an adjacent relay device as a transmission destination of the update complete notification and a network interface determined from a next transfer destination in the routing table after update are different is set as a destination and the relay device including the inhibit control unit is set as a next transfer destination.

7. The relay device according to claim 6, further comprising:
a high-speed switching unit that includes:
an alternate routing table storage unit that stores an alternate routing table used when a failure occurs in a direct link or an adjacent relay device in association with a failure part;
a loop determination unit that determines whether each route contained in the alternate routing table causes a micro-loop or not with respect to each alternate routing table; and
an alternate inhibit target routing table storage unit that stores an alternate inhibit target routing table indicating only an inhibit target route being a route determined to cause a micro-loop by the loop determination unit with respect to each alternate routing table, and
when a failure occurs in a direct link or an adjacent relay device, executes high-speed switching by updating the routing table stored in the current routing table storage unit to the alternate routing table stored in the alternate routing table storage unit and registering a corresponding alternate inhibit target routing table stored in the alternate inhibit target routing table storage unit into the inhibit target table,
wherein the route control unit operates when a failure occurs in a part different from a direct link and an adjacent relay device.

8. The relay device according to claim 7, wherein
the inhibit control unit determines whether an adjacent relay device as a transmission destination of the update complete notification performs the high-speed switching or not at route update of this time,
when it is determined that the high-speed switching is not performed, the inhibit control unit creates and transmits the inhibit release message to the adjacent relay device, and
when it is determined that the high-speed switching is performed, the inhibit control unit creates and transmits an inhibit release message corresponding to high-speed switching indicating only a route where a destination of a route in which a next transfer destination is the adjacent relay device before update of the routing table stored in the current routing table storage unit and a next transfer destination is not the adjacent relay device after update is set as a destination among routes indicated by the inhibit release message.

9. The relay device according to claim 1, further comprising:
a high-speed switching unit that includes:
an alternate routing table storage unit that stores an alternate routing table used when a failure occurs in a direct link or an adjacent relay device in association with a failure part;
a loop determination unit that determines whether each route contained in the alternate routing table causes a micro-loop or not with respect to each alternate routing table; and
an alternate inhibit target routing table storage unit that stores an alternate inhibit target routing table indicating only an inhibit target route being a route determined to cause a micro-loop by the loop determination unit with respect to each alternate routing table, and
when a failure occurs in a direct link or an adjacent relay device, executes high-speed switching by updating the routing table stored in the current routing table storage unit to the alternate routing table stored in the alternate routing table storage unit and registering a corresponding alternate inhibit target routing table stored in the alternate inhibit target routing table storage unit into the inhibit target table, wherein the route control unit operates when a failure occurs in a part different from a direct link and an adjacent relay device.

10. The relay device according to claim 1, wherein the route control unit updates the routing table stored in the current routing table storage unit to an alternate routing table transmitted from a control server included in the network system when a failure occurs in a link or a relay device in the network system and registers the inhibit target route information transmitted from the control server into the inhibit target table.

11. The relay device according to claim 10, wherein the inhibit control unit transmits a route update complete notification to the control server after completion of update of the routing table stored in the current routing table storage unit.

12. The relay device according to claim 1, wherein, when receiving a route update complete notification indicating completion of route update in an adjacent relay device, the inhibit control unit deletes each inhibit target route in which the adjacent relay device is set as a next transfer destination from the inhibit target table.

13. The relay device according to claim 12, wherein, when receiving the route update complete notification containing a route in which an adjacent relay device is set as a next transfer destination and for which inhibit should be released, the inhibit control unit deletes each route contained in the route update complete notification from the inhibit target table.

14. The relay device according to claim 1, wherein the inhibit control unit stores an estimated value of time taken for route update in each adjacent relay device and, when time from start of update of the routing table stored in the current routing table storage unit reaches the estimated value, deletes a route in which an adjacent relay device corresponding to the estimated value is set as a next transfer destination from the inhibit target table.

15. A network system where communication between a plurality of networks is relayed by a plurality of relay devices, wherein the relay device comprises:
a plurality of network interfaces that are respectively connected to networks with adjacent relay devices;
a current routing table storage unit that stores a routing table where a destination and a next transfer destination being any adjacent relay device are associated;
a route control unit that, when a failure occurs in a link or another relay device in the network system, updates the routing table stored in the current routing table storage unit and, upon update, acquires inhibit target route information on a route that generates a micro-loop in the routing table after update;
an inhibit target table that stores the inhibit target route information;
an inhibit control unit that, on condition that route update in an adjacent relay device is completed, deletes a route in which the adjacent relay device is set as a next transfer destination from the inhibit target table; and
a transfer processing unit that determines a transfer route of a packet based on the routing table stored in the current routing table storage unit and, on condition that the determined transfer route of the packet is not registered in the inhibit target table, executes transfer of the packet.

16. The network system according to claim 15, wherein the route control unit compares the routing tables before and after update and acquires the inhibit target route information from a comparison result.

17. The network system according to claim 16, wherein the route control unit acquires the inhibit target route information by obtaining a route in which a destination is the same and a next transfer destination is different between the routing tables before and after update as an inhibit target route.

18. The network system according to claim 15, wherein the inhibit control unit transmits a route update complete notification to each adjacent relay device after completion of update of the routing table stored in the current routing table storage unit.

19. The network system according to claim 18, wherein the inhibit control unit creates an inhibit release message indicating a route for which inhibit should be released in an adjacent relay device as a transmission destination of the route update complete notification by completion of update of the routing table stored in the current routing table storage unit and transmits the inhibit release message as the route update complete notification to the adjacent relay device.

20. The network system according to claim 19, wherein the inhibit control unit creates and transmits the inhibit release message indicating a route where a destination of a route in which a network interface connected to a network with an adjacent relay device as a transmission destination of the update complete notification and a network interface determined from a next transfer destination in the routing table after update are different is set as a destination and the relay device including the inhibit control unit is set as a next transfer destination.

21. The network system according to claim 20, wherein
the relay device further comprises a high-speed switching unit that operates when a failure occurs in a direct link or an adjacent relay device,
the high-speed switching unit includes:
an alternate routing table storage unit that stores an alternate routing table used when a failure occurs in a direct link or an adjacent relay device in association with a failure part;
a loop determination unit that determines whether each route contained in the alternate routing table causes a micro-loop or not with respect to each alternate routing table; and
an alternate inhibit target routing table storage unit that stores an alternate inhibit target routing table indicating only an inhibit target route being a route determined to cause a micro-loop by the loop determination unit with respect to each alternate routing table, and
when a failure occurs in a direct link or an adjacent relay device, executes high-speed switching by updating the routing table stored in the current routing table storage unit to the alternate routing table stored in the alternate routing table storage unit and registering a corresponding alternate inhibit target routing table stored in the alternate inhibit target routing table storage unit into the inhibit target table, and
the route control unit operates when a failure occurs in a part different from a direct link and an adjacent relay device.

22. The network system according to claim 21, wherein
the inhibit control unit determines whether an adjacent relay device as a transmission destination of the update complete notification performs the high-speed switching or not at route update of this time, when it is determined that the high-speed switching is not performed, the inhibit control unit creates and transmits the inhibit release message to the adjacent relay device, and when it is determined that the high-speed switching is performed, the inhibit control unit creates and transmits an inhibit release message corresponding to high-speed switching indicating only a route where a destination of a route in which a next transfer destination is the adjacent relay device before update of the routing table stored in the current routing table storage unit and a next transfer destination is not the adjacent relay device after update is set as a destination among routes indicated by the inhibit release message.

23. The network system according to claim 15, wherein the relay device further comprises a high-speed switching unit that operates when a failure occurs in a direct link or an adjacent relay device, the high-speed switching unit includes:

an alternate routing table storage unit that stores an alternate routing table used when a failure occurs in a direct link or an adjacent relay device in association with a failure part;

a loop determination unit that determines whether each route contained in the alternate routing table causes a micro-loop or not with respect to each alternate routing table; and an alternate inhibit target routing table storage unit that stores an alternate inhibit target routing table indicating only an inhibit target route being a route determined to cause a micro-loop by the loop determination unit with respect to each alternate routing table, and when a failure occurs in a direct link or an adjacent relay device, executes high-speed switching by updating the routing table stored in the current routing table storage unit to the alternate routing table stored in the alternate routing table storage unit and registering a corresponding alternate inhibit target routing table stored in the alternate inhibit target routing table storage unit into the inhibit target table, and the route control unit operates when a failure occurs in a part different from a direct link and an adjacent relay device.

24. The network system according to claim 15, further comprising:

a control server that, when a failure occurs in any link or relay device, transmits to each relay device an alternate routing table corresponding to the relay device and inhibit target route information, wherein the route control unit of each relay device updates the routing table stored in the current routing table storage unit to the alternate routing table transmitted from the control server and registers the inhibit target route information transmitted from the control server into the inhibit target table.

25. The network system according to claim 24, wherein the inhibit control unit transmits a route update complete notification to the control server after completion of update of the routing table stored in the current routing table storage unit.

26. The network system according to claim 25, wherein, when receiving a route update complete notification from any relay device, the control server transmits a route update complete notification of the relay device to an adjacent relay device of the relay device.

27. The network system according to claim 26, wherein the control server transmits a route update complete notification containing information indicating a route in which the relay device is set as a next transfer destination in an alternate inhibit target table corresponding to the adjacent relay device as a route for which inhibit should be released in the adjacent relay device to the adjacent relay device.

28. The network system according to claim 1, wherein, when receiving a route update complete notification indicating completion of route update in an adjacent relay device, the inhibit control unit deletes each inhibit target route in which the adjacent relay device is set as a next transfer destination from the inhibit target table.

29. The network system according to claim 28, wherein, when receiving the route update complete notification containing a route in which an adjacent relay device is set as a next transfer destination and for which inhibit should be released, the inhibit control unit deletes each route contained in the route update complete notification from the inhibit target table.

30. The network system according to claim 15, wherein the inhibit control unit stores an estimated value of time taken for route update in each adjacent relay device and, when time from start of update of the routing table stored in the current routing table storage unit reaches the estimated value, deletes a route in which an adjacent relay device corresponding to the estimated value is set as a next transfer destination from the inhibit target table.

31. A route switching method of each relay device in a network system where communication between a plurality of networks is relayed by a plurality of relay devices, the relay device including a routing table associating a destination and a next transfer destination being any adjacent relay device and an inhibit target table, determining a transfer route of a packet based on the routing table, and executing transfer of the packet on condition that the determined transfer route is not registered in the inhibit target table, the method comprising:

updating the routing table used by the relay device and, upon update, acquiring and storing inhibit target route information on a route that generates a micro-loop in the routing table after update; and on condition that route update in an adjacent relay device is completed, deleting a route in which the adjacent relay device is set as a next transfer destination from the inhibit target table.

32. A Non-transitory Computer Readable medium that records a program causing a computer to execute a process for route switching in each relay device in a network system where communication between a plurality of networks is relayed by a plurality of relay devices, the relay device including a routing table associating a destination and a next transfer destination being any adjacent relay device and an inhibit target table, determining a transfer route of a packet based on the routing table, and executing transfer of the packet on condition that the determined transfer route is not registered in the inhibit target table, the process comprising:

updating the routing table used by the relay device and, upon update, acquiring and storing inhibit target route information on a route that generates a micro-loop in the routing table after update; and on condition that route update in an adjacent relay device is completed, deleting a route in which the adjacent relay device is set as a next transfer destination from the inhibit target table.

* * * * *

UNITED STATES PATENT AND TRADEMARK OFFICE
CERTIFICATE OF CORRECTION

PATENT NO. : 8,432,913 B2　　　　　　　　　　　　　　　　　　　　　　Page 1 of 1
APPLICATION NO. : 12/922406
DATED : April 30, 2013
INVENTOR(S) : Kazuya Suzuki and Masahiro Jibiki It is certified that error appears in the above-identified patent and that said Letters Patent is hereby corrected as shown below:

In the Claims

Column 32, Line 8: In Claim 28, delete "claim 1," and insert -- claim 15 --

Signed and Sealed this
Fifth Day of August, 2014

Michelle K. Lee
*Deputy Director of the United States Patent and Trademark Office*